US011653422B2

(12) United States Patent
Lee et al.

(10) Patent No.: US 11,653,422 B2
(45) Date of Patent: May 16, 2023

(54) INDUCTION HEATING DEVICE HAVING IMPROVED USER EXPERIENCE AND USER INTERFACE

(71) Applicant: LG Electronics Inc., Seoul (KR)

(72) Inventors: Jae-Woo Lee, Seoul (KR); Seongjun Kim, Seoul (KR); Seungbok Ok, Seoul (KR)

(73) Assignee: LG Electronics Inc., Seoul (KR)

(*) Notice: Subject to any disclaimer, the term of this patent is extended or adjusted under 35 U.S.C. 154(b) by 648 days.

(21) Appl. No.: 16/712,016

(22) Filed: Dec. 12, 2019

(65) Prior Publication Data
US 2020/0337121 A1  Oct. 22, 2020

(30) Foreign Application Priority Data
Apr. 18, 2019  (KR) .................. 10-2019-0045749

(51) Int. Cl.
H05B 6/06  (2006.01)
H05B 6/44  (2006.01)
(Continued)

(52) U.S. Cl.
CPC ......... H05B 6/062 (2013.01); G06F 3/04883 (2013.01); H05B 1/0258 (2013.01);
(Continued)

(58) Field of Classification Search
CPC .............. H05B 1/0258; H05B 2213/03; H05B 2213/05; H05B 2213/07; H05B 2206/02;
(Continued)

(56) References Cited

U.S. PATENT DOCUMENTS

| 9,591,698 B2 | 3/2017 | Lee et al. |
| 2005/0029245 A1 | 2/2005 | Gerola et al. |
| 2011/0168694 A1 | 7/2011 | Sadakata et al. |

FOREIGN PATENT DOCUMENTS

| DE | 102012205100 | 10/2012 |
| DE | 112013004163 | 5/2015 |

(Continued)

OTHER PUBLICATIONS

Extended European Search Report in European Appln. No. 20150185.5, dated Jul. 28, 2020, 6 pages.
(Continued)

Primary Examiner — Hung D Nguyen
(74) Attorney, Agent, or Firm — Fish & Richardson P.C.

(57) ABSTRACT

An induction heating device includes a case, working coils, a cover plate, an input interface, a first control module configured to detect one or more of the working coils at a position of an object seated on the cover plate, a second control module configured to receive information on the position of the object and control the input interface to display an image of a heating zone, and light emitting elements disposed below a periphery of each of the plurality of working coils. The second control module is configured to analyze an arrangement form of the one or more of the working coils based on the information on the position of the object, and control driving of at least one of the light emitting elements based on a result of analyzing the arrangement form.

20 Claims, 23 Drawing Sheets

(51) Int. Cl.
*G06F 3/04883* (2022.01)
*H05B 1/02* (2006.01)
*H05B 6/12* (2006.01)

(52) U.S. Cl.
CPC ......... *H05B 6/1218* (2013.01); *H05B 6/1272* (2013.01); *H05B 6/44* (2013.01); *H05B 2206/02* (2013.01)

(58) Field of Classification Search
CPC ...... H05B 2206/022; H05B 6/02; H05B 6/06; H05B 6/062; H05B 6/065; H05B 6/12; H05B 6/1209; H05B 6/1218; H05B 6/1236; H05B 6/1245; H05B 6/1254; H05B 6/1263; H05B 6/1272; H05B 6/365; H05B 6/42; H05B 6/44; Y02B 40/00; Y02B 40/126; G06F 3/0416; G06F 3/0482; G06F 3/0484; G06F 3/04845; G06F 3/0488; G06F 3/04883; G06F 3/04886
USPC ................ 219/600, 620, 622, 624, 672, 675
See application file for complete search history.

(56) References Cited

FOREIGN PATENT DOCUMENTS

| | | | |
|---|---|---|---|
| DE | 112013004163 T5 * | 5/2015 | ............ F24C 15/102 |
| EP | 1505854 | 2/2005 | |
| EP | 2252129 | 11/2010 | |
| EP | 2252130 | 11/2010 | |
| EP | 2177076 | 10/2011 | |
| EP | 3104664 | 12/2016 | |
| WO | WO2006072388 | 7/2006 | |
| WO | WO2008122495 | 10/2008 | |
| WO | WO2009053279 | 4/2009 | |
| WO | WO2016067861 | 5/2016 | |
| WO | WO-2016067861 A * | 5/2016 | |

OTHER PUBLICATIONS

Communication of a Notice of Opposition in European Appln. No. 20150185.5, dated Dec. 20, 2021, 57 pages.

* cited by examiner

INDUCTION HEATING DEVICE HAVING IMPROVED USER EXPERIENCE AND USER INTERFACE

CROSS-REFERENCE TO RELATED APPLICATION

The present disclosure claims priority to and the benefit of Korean Patent Application No. 10-2019-0045749, filed on Apr. 18, 2019, the disclosure of which is incorporated herein by reference in its entirety.

TECHNICAL FIELD

The present disclosure relates to an induction heating device having improved user experience and user interface.

BACKGROUND

Various types of cooking utensils may be used to heat food in homes and restaurants. For example, gas ranges may use gas as fuel. In some cases, cooking devices may heat an object such as a vessel, a pot, etc. with electricity instead of gas.

A method of heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object (for example, a cooking vessel) through radiation or conduction, to heat the object. In the induction heating method, eddy current may be generated in the object made of metal based on a magnetic field generated, around the coil based on a high-frequency power of a predetermined magnitude applied to the coil to heat the object.

In some cases, an induction heating device that uses the induction heating method may include a working coil in multiple regions of the device to heat the plurality of objects (for example, cooking vessels).

In some cases, an induction heating device (that is, a zone free type induction heating device) may heat a single object using a plurality of working coils simultaneously. The zone free type induction heating device may heat the object inductively in a zone in which a plurality of working coils are present, regardless of a size and a position of the object.

In some examples, the zone free type induction heating device may include an input interface. For instance, the input interface may be a module to input heating intensity or driving time that a user desires, and may be variously implemented as a physical button or a touch panel. Further, the input interface may also include a display panel (e.g., a touch screen type panel) in which a driving state of the induction heating device (for example, an image of a heating zone for the object) is displayed.

In some cases, the zone free type induction heating device may detect the object arranged above the plurality of working coils and may activate the working coil based on a detected position of the object, and may display an image of the heating zone corresponding to the position of the activated working coil on the input interface.

An induction heating device in related art will be described with reference to FIGS. 1 and 2.

Referring to FIG. 1, the induction heating device in related art includes a display 18 that displays positions of a plurality of working coils 10 and objects 16a and 16b.

Specifically, in the induction heating device of FIG. 1, the display 18 may display the position of a working coil 10 that directly heats the objects 16a and 16b.

The position of the working coil in heating operation may be displayed only on the display 18, not on a cooktop surface (that is, an upper plate on which the object is arranged). In this case, it may be difficult to recognize a state in which the object is incorrectly arranged even when the user incorrectly arranges the object (for example, the user may arrange the object in a biased manner). In some cases, heating performance and efficiency of the working coil may be degraded when the object is incorrectly arranged.

FIG. 2 shows an induction heating device in related art different from the induction heating device shown in FIG. 1.

Specifically, the induction heating device in related art includes a working coil 11, a light emitting element 230 that is installed around the working coil 11, and the like. In the induction heating device in FIG. 2, information on whether the object is recognized and whether the object is heated may be displayed through a light emitting element 230 installed around the working coil 11.

The light emitting element 230 may be arranged around the individual working coil 11 to display a shape of the individual working coil 11. In this case, it may be difficult to display the object having various sizes and shapes so that the user may easily recognize the object through the light emitting elements.

SUMMARY

The present disclosure provides an induction heating device that may improve accuracy in arranging an object, by a user.

The present disclosure also provides an induction heating device that may improve recognition of the user with respect to an area in which the object in detected.

The present disclosure further provides an induction heating device having improved user experience (UX) and user interface (UI).

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and advantages of the present disclosure may be implemented by means defined in claims and a combination thereof.

In some implementations, the induction heating device may improve accuracy in arranging the object, by the user, by visually providing the user with the area in which the object is detected through the input interface and an indicator.

In some implementations, the induction heating device may improve awareness of the user with respect to the area in which the object is detected by controlling driving of the light emitting element based on a form compensation algorithm.

According to one aspect of the subject matter described in this application, an induction heating device includes: a case that defines a cook zone; a plurality of working coils that are disposed in the cook zone; a cover plate that is coupled to an upper end of the case and configured to seat an object to be heated on an upper surface of the cover plate; an input interface that is flush with the upper surface of the cover plate, that is configured to receive touch input from a user, and that is configured to display one or more images; a first control module configured to detect one or more of the plurality of working coils that are disposed at a location corresponding to a position of the object seated on the upper surface of the cover plate; a second control module configured to receive information on the position of the object from the first control module and control the input interface to display an image of a heating zone for the object based on the information on the position of the object; and a plurality of light emitting elements that are configured to emit light, that are configured to be controlled by the second control module, and that are disposed vertically below a periphery of each of the plurality of working coils. The second control module is configured to: analyze an arrangement form of the one or more of the plurality of working coils based on the information on the position of the object, and control driving of at least one of the plurality of light emitting elements based on a result of analyzing the arrangement form.

Implementations according to this aspect may include one or more of the following features. For example, the second control module may be configured to, based on the position of the object corresponding to a first working coil and a second working coil among the plurality of working coils, turn on one or more of the plurality of light emitting elements arranged below the periphery of each of the first working coil and the second working coil. In some examples, the second control module may be configured to, based on the first working coil and the second working coil being disposed adjacent to each other and arranged along a row or a column defined by the plurality of working coils, turn off one or more of the plurality of light emitting elements arranged between the first working coil and the second working coil.

In some implementations, the second control module may be configured to, based on the first working coil and the second working coil being disposed adjacent to each other and arranged along a first diagonal direction crossing different rows and columns defined by the plurality of working coils, turn on one or more of the plurality of light emitting elements arranged vertically below the periphery of a third working coil that is disposed adjacent the first working coil and the second working coil at a position in a second diagonal direction orthogonal to the first diagonal direction, and turn off one or more of the plurality of light emitting elements arranged between the first working coil and the third working coil and one or more of the plurality of light emitting elements arranged between the second working coil and the third working coil.

In some implementations, the second control module may be configured to, based on the position of the object corresponding to a first working coil, a second working coil, and a third working coil among the plurality of working coils, turn on one or more of the plurality of light emitting elements arranged vertically below the periphery of each of the first working coil, the second working coil, and the third working coil.

In some examples, the second control module may be configured to, based on (i) the first working coil and the second working coil being disposed adjacent to each other and arranged along a row defined by the plurality of working coils, (ii) the first working coil and the third working coil being disposed adjacent to each other and arranged along a column defined by the plurality of working coils, and (iii) the second working coil and the third working coil being disposed adjacent to each other and arranged along a first diagonal direction crossing different rows and columns defined by the plurality of working coils, turn on one or more of the plurality of light emitting elements arranged below the periphery of a fourth working coil that is disposed around the second working coil and the third working coil at a position in a second diagonal direction orthogonal to the first diagonal direction, and turn off one or more of the plurality of light emitting elements arranged between each pair of the first working coil, the second working coil, the third working coil, and the fourth working coil.

In some implementations, the second control module may be configured to, based on the object including a first object disposed at a first position and a second object disposed at a second position, turn on one or more of the plurality of light emitting elements arranged vertically below the periphery of each of a first working coil and a second working coil corresponding to the first position and each of a third working coil and a fourth working coil corresponding to the second position, and turn off one or more of the plurality of light emitting elements arranged between the first working coil and the second working coil and one or more of the plurality of light emitting elements arranged between the third working coil and the fourth working coil.

In some implementations, the second control module may be configured to, based on the first object and the second object being disposed adjacent to each other, turn on one or more of the plurality of light emitting elements arranged between one of the first working coil or the second working coil and one of the third working coil or the fourth working coil.

In some implementations, the induction heating may further include a plurality of light guides disposed around each of the plurality of working coils and configured to indicate a heating intensity of each of the plurality of working coils and whether each of the plurality of working coils is driven. The plurality of light emitting elements may be disposed vertically below each of the plurality of light guides.

In some implementations, the input interface may be configured to display the image of the heating zone for the object in an area corresponding to the position of the object on the cover plate, the image of the heating zone including a representation of a size of the object and an orientation of the object. The input interface may be configured to display a power image for controlling activation of the heating zone, the power image being displayed at a central region of the image of the heating zone.

In some examples, the input interface may be configured to, based on the touch input being received on the power image, provide the second control module with the touch input, and the second control module may be configured to, based on the touch input received from the input interface, control the input interface to display at least one of an image indicating a heating intensity or a timer image.

In some implementations, the second control module may be configured to: receive the touch input from the input interface; and based on the touch input received from the input interface, control at least one of the plurality of light emitting elements and the input interface. In some examples, the first control module may be configured to: receive the touch input from the second control module; and control driving of at least one of the plurality of working coils based on the touch input received from the second control module.

According to another aspect, a method is described for operating an induction heating device that includes a case that defines a cook zone, a plurality of working coils disposed in the cook zone, a cover plate coupled to an upper end of the case and configured to seat an object to be heated on an upper surface of the cover plate, an input interface that is flush with the upper surface of the cover plate, that is configured to receive touch input from a user, and that is configured to display one or more images. The method includes: detecting one or more of the plurality of working coils that are disposed at a location corresponding to a position of the object seated on the upper surface of the cover plate; determining information corresponding to the position of the object; controlling the input interface to display an image of a heating zone for the object based on the information corresponding to the position of the object; analyzing an arrangement form of the one or more of the plurality of working coils based on the information corresponding to the position of the object; and based on a result of analyzing the arrangement form, controlling driving of at least one of a plurality of light emitting elements that are configured to emit light and that are disposed vertically below a periphery of each of the plurality of working coils.

Implementations according to this aspect may include one or more of the following features. For example, controlling the driving of the at least one of the plurality of light emitting elements may include, based on the position of the object corresponding to a first working coil and a second working coil among the plurality of working coils, turning on one or more of the plurality of light emitting elements arranged below the periphery of each of the first working coil and the second working coil.

In some implementations, controlling the driving of the at least one of the plurality of light emitting elements may include, based on the first working coil and the second working coil being disposed adjacent to each other and arranged along a row or a column defined by the plurality of working coils, turning off one or more of the plurality of light emitting elements arranged between the first working coil and the second working coil.

In some implementations, controlling the driving of the at least one of the plurality of light emitting elements may include: based on the first working coil and the second working coil being disposed adjacent to each other and arranged along a first diagonal direction crossing different rows and columns defined by the plurality of working coils, turning on one or more of the plurality of light emitting elements arranged vertically below the periphery of a third working coil that is disposed adjacent the first working coil and the second working coil at a position in a second diagonal direction orthogonal to the first diagonal direction; and turning off one or more of the plurality of light emitting elements arranged between the first working coil and the third working coil and one or more of the plurality of light emitting elements arranged between the second working coil and the third working coil.

In some implementations, the method may further include determining a first position corresponding to a first object seated on the cover plate and a second position corresponding to a second object seated on the cover plate. In the same or other implementations, controlling the driving of the at least one of the plurality of light emitting elements may include: turning on one or more of the plurality of light emitting elements arranged vertically below the periphery of each of a first working coil and a second working coil disposed at the first position and each of a third working coil and a fourth working coil disposed at the second position; and turning off one or more of the plurality of light emitting elements arranged between the first working coil and the second working coil and one or more of the plurality of light emitting elements arranged between the third working coil and the fourth working coil.

In some implementations, controlling the driving of the at least one of the plurality of light emitting elements may include, based on the first object and the second object being disposed adjacent to each other, turning on one or more of the plurality of light emitting elements arranged between one of the first working coil or the second working coil and one of the third working coil or the fourth working coil.

In some implementations, the method may further include: displaying, on the input interface, the image of the heating zone for the object in an area corresponding to the position of the object on the cover plate, the image of the heating zone including a representation of a size of the object and an orientation of the object; and displaying, on the input interface, a power image for controlling activation of the heating zone, the power image being displayed at a central region of the image of the heating zone.

In some implementations, the induction heating device may reduce a possibility that the object is eccentrically arranged above the working coil by improving the accuracy in arranging the object, by the user, thereby preventing degradation of heating performance and efficiency of the working coil due to the eccentric arrangement of the object.

In some implementations, the induction heating device may improve recognition of the user with respect to the area in which the object is detected, so that the user may easily determine an area of the working coil in driving for a specific object.

In some implementations, the induction heating device may improve user convenience in various situations by improving the user experience and the user interface.

Hereafter, a specific effect of the present disclosure, in addition to the above-mentioned effect, will be described together while describing a specific matter for implementing the present disclosure.

DETAILED DESCRIPTION

The above mentioned objects, features, and advantages of the present disclosure will be described in detail with reference to the accompanying drawings, so that those skilled in the art to which the present disclosure pertains may easily implement the technical idea of the present disclosure.

Hereinafter, an induction heating device according to an implementation of the present disclosure will be described.

Figure 3:
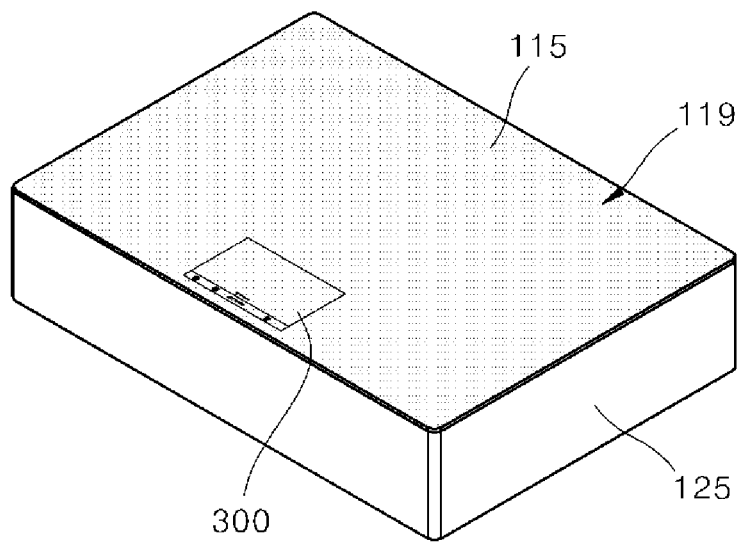
FIG. 3 is a perspective view showing an example of an induction heating device according to an implementation of the present disclosure.
Figure 4:
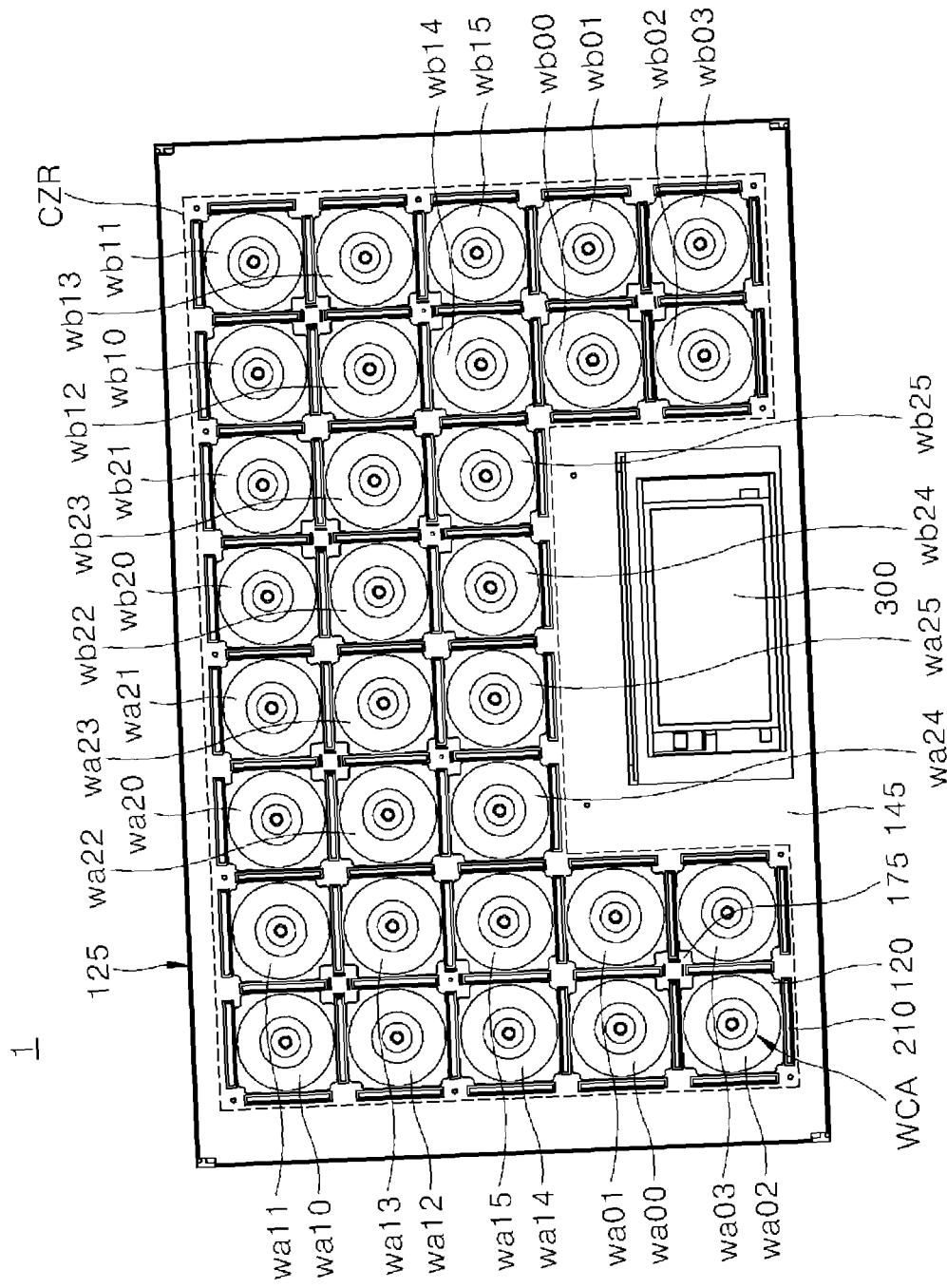
FIG. 4 is a plan view showing example components of the induction heating device of FIG. 3.
Figure 5:
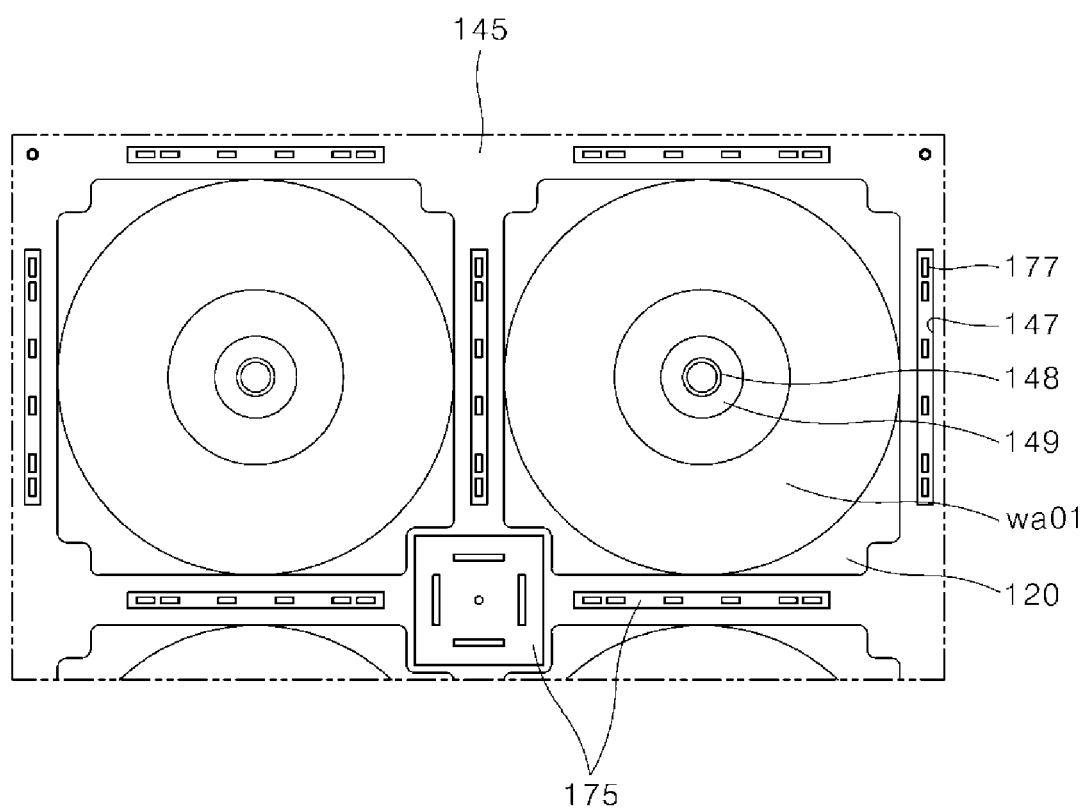
FIGS. 5 and 6 are partial enlarged views showing the induction heating device of FIG. 4.
Figure 6:
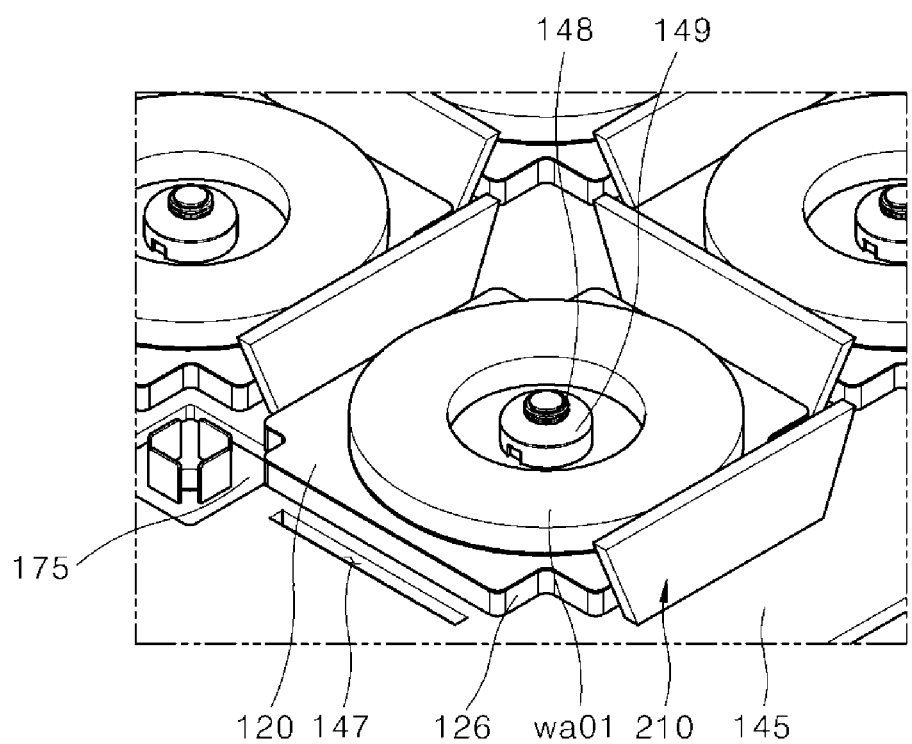
Figure 7:
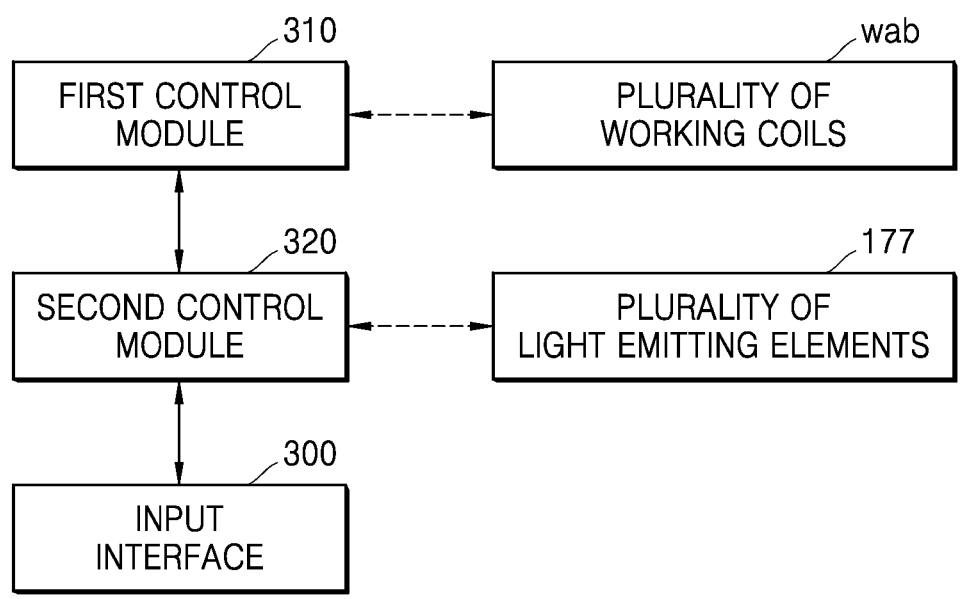
FIG. 7 is a block diagram showing an example control flow of the induction heating device of FIG. 3.

FIG. 3 is a perspective view showing an example of an induction heating device according to an implementation of the present disclosure. FIG. 4 is a plan view showing example components of FIG. 3, where some components may be omitted. FIGS. 5 and 6 are partial enlarged views showing the induction heating device of FIG. 4. FIG. 7 is a block diagram showing an example of a control flow of the induction heating device of FIG. 3.

For convenience of explanation, a cover plate 119 of FIG. 3 is omitted from FIG. 4. Some other components (for example, a light guide) of the induction heating device 1 of FIG. 4 may be omitted in FIGS. 5 and 6 for convenience of explanation.

Referring to FIGS. 3 to 7, the induction heating device 1 may include a case 125, a cover plate 119, a base plate 145, an indicator substrate 175, an indicator (that is, including a light emitting element 177 and a light guide 210), an input interface 300, a first control module 310, a second control module 320, and a working coil assembly WCA. In some implementations, the first control module 310 and the second control module 320 may include one or more processors (e.g., a microprocessor, an integrated circuit, a controller, etc.) In some implementations, the first control module 310 and the second control module 320 may be software components that run on the one or more processors.

The case 125 may be thermally insulated to prevent heat generated by the working coil (for example, wa01) from leaking to an outside thereof.

Various types of components included in the induction heating device 1, for example, the working coil assembly WCA, the base plate 145, the indicator substrate 175, the light emitting element 177, and the light guide 210, may be installed in the case 125.

The induction heating device 1 may include various types of devices installed in the case 125. For example, the induction heating device 1 may include a power supply that provides alternating current (AC) power, a rectifier that rectifies the AC power of the power to supply direct current (DC) power, and an inverter that coverts the DC power rectified by the rectifier into resonant current through switching operation and provides the working coil (e.g., wa01) with the converted resonant current. The induction heating device 1 may further include a relay or a semiconductor switch that turns on or turns off the working coil (e.g., wa01), an indicator substrate support in which an indicator substrate 175 is installed, and a blowing fan that cools heat generated by the working coil (e.g., wa01) or the light emitting element 177.

In some examples, the cover plate 119 is coupled to an upper end of the case 125 to shield an inside the case 125, and an object may be arranged on the upper surface of the cover plate 119.

Specifically, the cover plate 119 may include an upper plate 115 (that is, an upper surface of the cover plate 119) to place an object such as a cooking vessel thereon, and the heat generated by the working coil (e.g., wa01) may be transferred to the object through the upper plate 115.

In some implementations, the upper plate 115 may be made of, for example, glass, and the upper plate 115 may be installed with the input interface 300 that receives the touch input from the user and transmits the touch input to the second control module 320.

Specifically, the input interface 300 may be flatly buried in the upper surface of the cover plate 119, that is, the upper plate 115 (that is, flatly installed on the same plane as the upper plate 115) and may be controlled by the second control module 320 to display a specific image (for example, an image of heating zone, an image of residual heat, an image of heating intensity, a timer image, and the like). The input interface 300 may also receive the touch input from a user and provide the second control module 320 with the received touch input.

In some examples, the input interface 300 may include a module to input heating intensity or heating time, and the like the user desires and may be variously implemented as a physical button or a touch panel. The input interface 300 may also include a display panel on which a driving state of the induction heating device 1 is displayed (that is, include a touch screen type panel).

In some implementations, the input interface 300 may transmit the touch input received from the user to the second control module 320. The second control module 320 may transmit the touch input to the first control module 310. Details thereof will be described below.

In some examples, the working coil assembly WCA may include a working coil (e.g., wa01), a ferrite core 126, and a mica sheet 120 (that is, a first mica sheet).

In some implementations, when the induction heating device 1 is a zone free type induction heating device, a plurality of working coil assemblies WCAs may be present as shown in FIG. 4, and the plurality of working coil assemblies (for example, WCAs) may be spaced apart from one another by a predetermined distance.

For example, referring to FIG. 4, a plurality of working coils "wab" (see FIG. 7) may include wa00 to wa03, wa10 to wa15, wa20 to wa25, wb00 to wb03, wb10 to wb15, and wb20 to wb25. The plurality of working coils "wab" may be included in the plurality of working coil assemblies (for example, WCAs) and controlled in groups or individually.

Specifically, the plurality of working coils may be installed in a cook zone CZR inside the case 125, and may be controlled in groups, for instance, a first group of working coils (e.g., wa00 to wa03) and a second group of working coils (e.g., wa10 to wa15). Further, each group of working coils may be independently controlled by an individual inverter, and the working coils included in each group of working coils may be independently controlled by the above-described relay or semiconductor switch.

However, for convenience of explanation, one working coil assembly WCA will be described.

Specifically, the working coil (e.g., wa01) may be formed of an annularly-coiled conductive wire at a plurality of times and may generate an AC magnetic field. The driving of the working coil wa01 may be controlled by the first control module 310 and the mica sheet 120 and the ferrite core 126 may be sequentially arranged beneath or below the working coil wa01.

The ferrite core 126 may be arranged below the working coil wa01 and a core hole may be formed at a central region of the ferrite core 126 to vertically overlap with an annular inner side of the working coil wa01.

Specifically, a base plate 145 may be arranged below the ferrite core 126, and a mica sheet 120 may be arranged between the ferrite core 126 and the working coil wa01.

Further, as shown in FIGS. 5 and 6, a packing gasket 149 is fastened to the core hole so that the ferrite core 126 may be fixed to the base plate 145, and a sensor 148 may be installed at an upper end of the packing gasket 149. In some implementations, the sensor 148 may detect a temperature of the upper plate 115, a temperature of the working coil wa01 or an operation of the working coil wa01 and may transmit the temperature information or the operation information, and the like, to the above-mentioned second control module 320 or the first control module 310.

Further, the ferrite core 126 may be fixed to the mica sheet 120 through a sealant, and may diffuse the AC magnetic field generated by the working coil wa01.

The mica sheet 120 (that is, a first mica sheet) may be arranged between the working coil wa01 and the ferrite core 126 and may have a sheet hole to vertically overlap with the annular inner side of the working coil wa01 at a central region of the mica sheet 120.

Specifically, the mica sheet 120 may be fixed to the working coil wa01 and the ferrite core 126 by the sealant, and may prevent the heat generated by the working coil wa01 from being directly transferred to the ferrite core 126.

In some implementations, although not shown in the figures, the working coil assembly WCA may further include a second mica sheet that is fixed to an upper end of the working coil wa01 by the sealant and has a second sheet hole to vertically overlap with the annular inner side of the working coil wa01 at a central region of the second mica sheet.

However, for convenience of explanation, details of the second mica sheet will be omitted.

In some examples, the working coil assembly WCA may be installed in the base plate 145.

Specifically, the ferrite core 126, the mica sheet 120, and the working coil wa01 may be sequentially stacked on or above the base plate 145. Further, an indicator substrate 175 may be arranged below the base plate 145 to be spaced apart from the base plate 145.

Further, the base plate 145 may be formed integrally, for example, and may be made of aluminum (Al), but is not limited thereto.

In addition, the light guide 210 may be installed in the base plate 145.

Specifically, the light guide 210 may be installed in the base plate 145 to be provided around the working coil wa01. That is, four light guides (for example, 210) per one working coil wa01 may be installed around the corresponding working coil wa01.

The light guide 210 displays the light emitted from the light emitting element 177 through an upper light emitting surface (i.e., an upper surface) to display whether the working coil wa01 is driven and the output intensity of the working coil wa01 (that is, the heating intensity of the working coil wa01). Further, each light guide 210 may be installed in each light guide installation hole 147 formed in the base plate 145.

As shown in FIGS. 5 and 6, the light guide installation hole 147 to install the light guide 210 may be formed on the base plate 145 in the space between the ferrite cores. That is, the light guide installation hole 147 may be formed in the base plate 145 at the position in which the light guide 210 is installed. Therefore, the light guide installation hole 147 may also be formed around the working coil wa01, and four light guide installation holes (for example, 147) per one working coil wa01 may be formed around the corresponding working coil wa01.

Further, the number of the light guide installation holes 147 may be the same as the light guides 210.

In some implementations, the light emitted from the light emitting element 177 installed on the indicator substrate 175 may be transmitted to the light guide 210 through the light guide installation hole 147. Accordingly, the light guide 210 may display whether the working coil wa01 is driven and the output intensity of the working coil wa01 (that is, the heating intensity of the working coil wa01).

The indicator substrate 175 may be arranged below the base plate 145 to be spaced apart from the base plate 145 and the light emitting element 177 may be installed on the indicator substrate 175.

Specifically, the indicator substrate 175 may be installed on an indicator substrate support so that the indicator substrate 175 is spaced downward from the base plate 145. Further, the indicator substrate 175 may have a form of a PCB (i.e., a printed circuit substrate), for example. Although not shown in the figures, various types of components to drive the light emitting element 177 may be installed on the indicator substrate 174.

In some implementations, as shown in FIG. 5, a plurality of light emitting elements may be provided and the plurality of light emitting elements (for example, 177) may be installed on the indicator substrate 175 to be exposed upward through the light guide installation hole 147 (that is, may be provided below the light guide 210, that is, may be provided below at a periphery of the working coil wa01). Thus, the light emitted from the light emitting element 177 may be transmitted to the light guide 210 through the light guide installation hole 147.

The plurality of light emitting elements (e.g., 177) may include, for example, light emitting diodes (LEDs), respectively, and may be controlled by the second control module 320.

In some examples, the first control module 310 may control driving of the plurality of working coils (for example, WCs).

Further, the first control module 310 may detect a degree of attenuation of resonant current flowing through each working coil, and may detect which of the working coils seats the object thereabove based on the detection result.

In more detail, when the object is located above the working coil wa01, an overall resistance of the object may increase due to a resistance of the object, thereby increasing the degree of attenuation of the resonant current flowing through the working coil wa01.

The first control module 310 detects the resonance current flowing through the working coil wa01 and detects whether there is an object above the working coil wa01 based on the detected value.

In some implementations, the first control module 310 may detect the object through other methods. In an implementation of the present disclosure, the detection of the object through the above-mentioned method will be described.

Further, the first control module 310 may provide the second control module 320 with information on the detected position of the object, and may receive the touch input of the user from the second control module 320.

In some implementations, the first control module 310 may control driving of at least one of the plurality of working coils based on the touch input of the user received from the second control module 320 (for example, control the driving of the working coil at which the object is detected).

In some implementations, the information on the detected position of the object may include information on the degree of attenuation of the resonance current flowing through each working coil of the plurality of working coils at which the object is detected.

In some examples, the second control module 320 may control the image displayed on the input interface 300 and driving of the plurality of light emitting elements (e.g., 177).

Specifically, the second control module 320 may receive the touch input of the user from the input interface 300, and may provide the first control module 310 with the received touch input, or may provide the input interface 300 or the light emitting element 177 based on the received touch input.

The second control module 320 may receive information on the position of the object from the first control module 310 and may control the input interface 300 so that the image of the heating zone for the object is displayed on the input interface 300 based on the received information on the position of the object.

Further, the second control module 320 may analyze an arrangement form of the working coil at which the object is detected, of the plurality of working coils, based on the information on the position of the object, and may control driving of at least one of the plurality of light emitting elements (e.g., 177) based on the analysis result.

As described above, the second control module 320 performs various kinds of control functions, and a more detailed description thereof will be described below.

On the other hand, according to the implementation of the present disclosure, the induction heating device 1 may also have a wireless power transmission function based on the above-described configuration and features.

That is, recently, a technology for supplying power wirelessly has been developed and applied to electronic devices. Electronic devices that use wireless power transmission technology are charged by simply placing the electronic devices on a charging pad without connecting the electronic device to a separate charge connector. The electronic devices in which the wireless power transmission is used may not require a wired cord or a charger, thereby improving portability of the electronic devices and reducing a size and a weight of the electronic devices.

The wireless power transmission technology may use an electromagnetic induction method using a coil, a resonance method using resonance, and a radio wave radiation method in which electrical energy is converted into a microwave and the converted microwave is transmitted. Among them, the electromagnetic induction method uses electromagnetic induction between a primary coil (for example, a working coil wa01) provided in a device that transmits wireless power and a secondary coil provided in a device that receives wireless power to transmit the power.

In some implementations, the induction heating method of the induction heating device 1 substantially has the same principle as the wireless power transmission technology using electromagnetic induction in that the object is heated by electromagnetic induction.

Therefore, the induction heating device 1 according to the implementation of the present disclosure may have not only the induction heating function but also the wireless power transmission function. Further, the induction heating mode or the wireless power transmission mode may be controlled by the second control module 320 or the first control module 310, and the induction heating function or the wireless power transmission function may be used selectively as necessary.

As described above, the induction heating device 1 according to the implementation of the present disclosure has the above-described configuration and features, and hereinafter, a form compensation algorithm of the induction heating device 1 is described with reference to FIGS. 8 to 23.

FIGS. 8 to 23 show form compensation algorithms of the induction heating device of FIG. 3.

In some implementations, FIGS. 8 to 10, 11 to 13, 14 to 16, 17 to 19, 20 to 23 show examples of different form compensation algorithms from one another.

Figure 1:
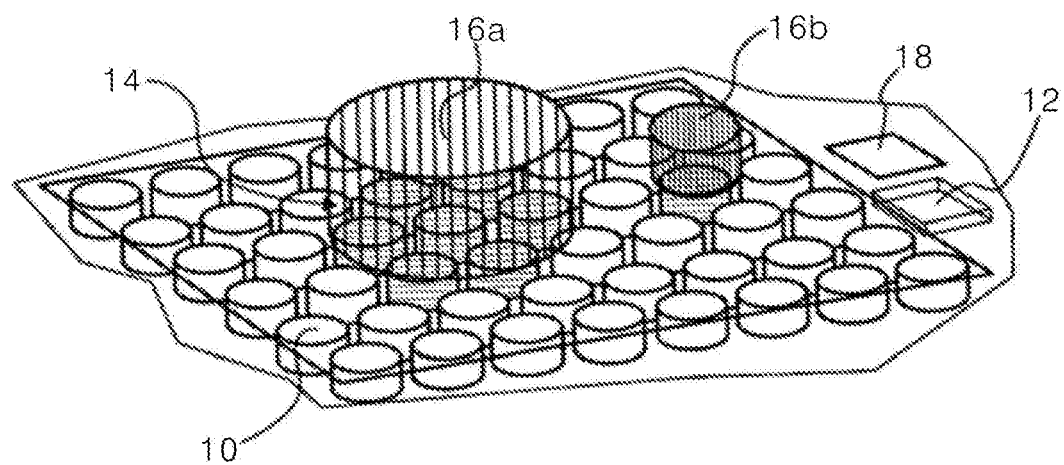
FIGS. 1 and 2 show induction heating devices in related art.
Figure 2:
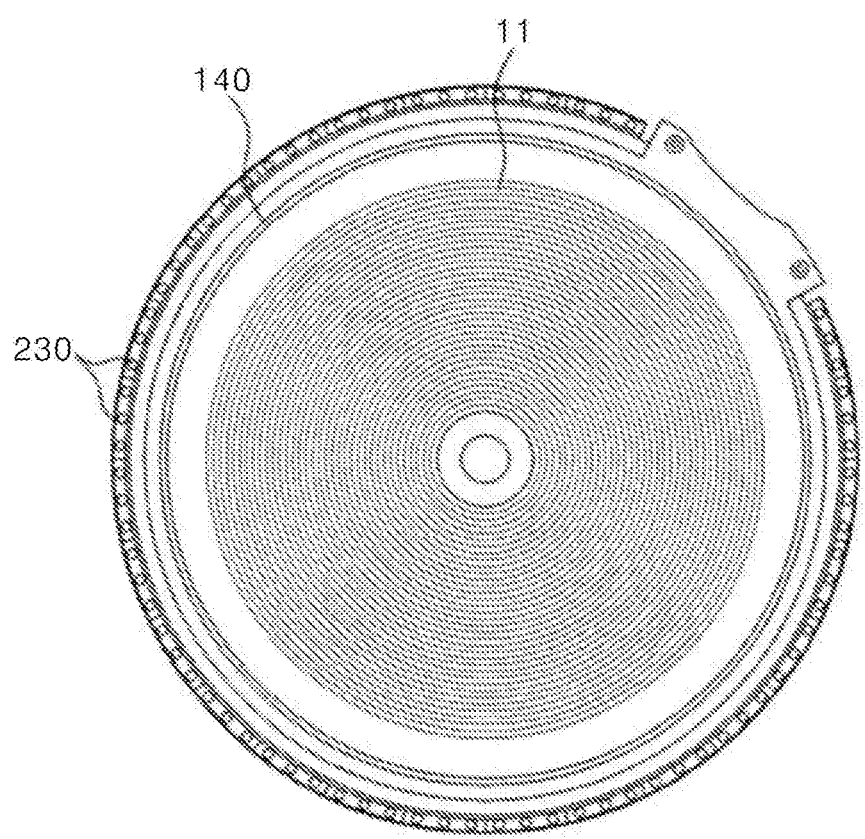

First, referring to FIGS. 7 to 10, a first example method of controlling, by the induction heating device 1 of FIG. 1, a light emitting element based on the form compensation algorithm.

Specifically, when an object HT is arranged on an upper plate (115 of FIG. 3) of a cover plate (119 of FIG. 3), the first control module 310 may detect which of a plurality of working coils seats the object HT thereabove.

A first control module 310 may detect a degree of attenuation of the resonance current flowing through each working coil, and may detect which of working coils seats the object HT thereabove based on the detection result.

When the position of the object HT is detected (for example, detected above some working coils wb10, wb12, wb13, wb14, and wb23), the first control module 310 may provide a second control module 320 with the information on the detected position of the object HT.

The second control module 320 may turn on a light emitting element arranged below a periphery of the working coils wb10, wb12, wb13, wb14, and wb23 at which the object HT is detected based on the information on the position of the object HT received from the first control module 310.

Figure 8:
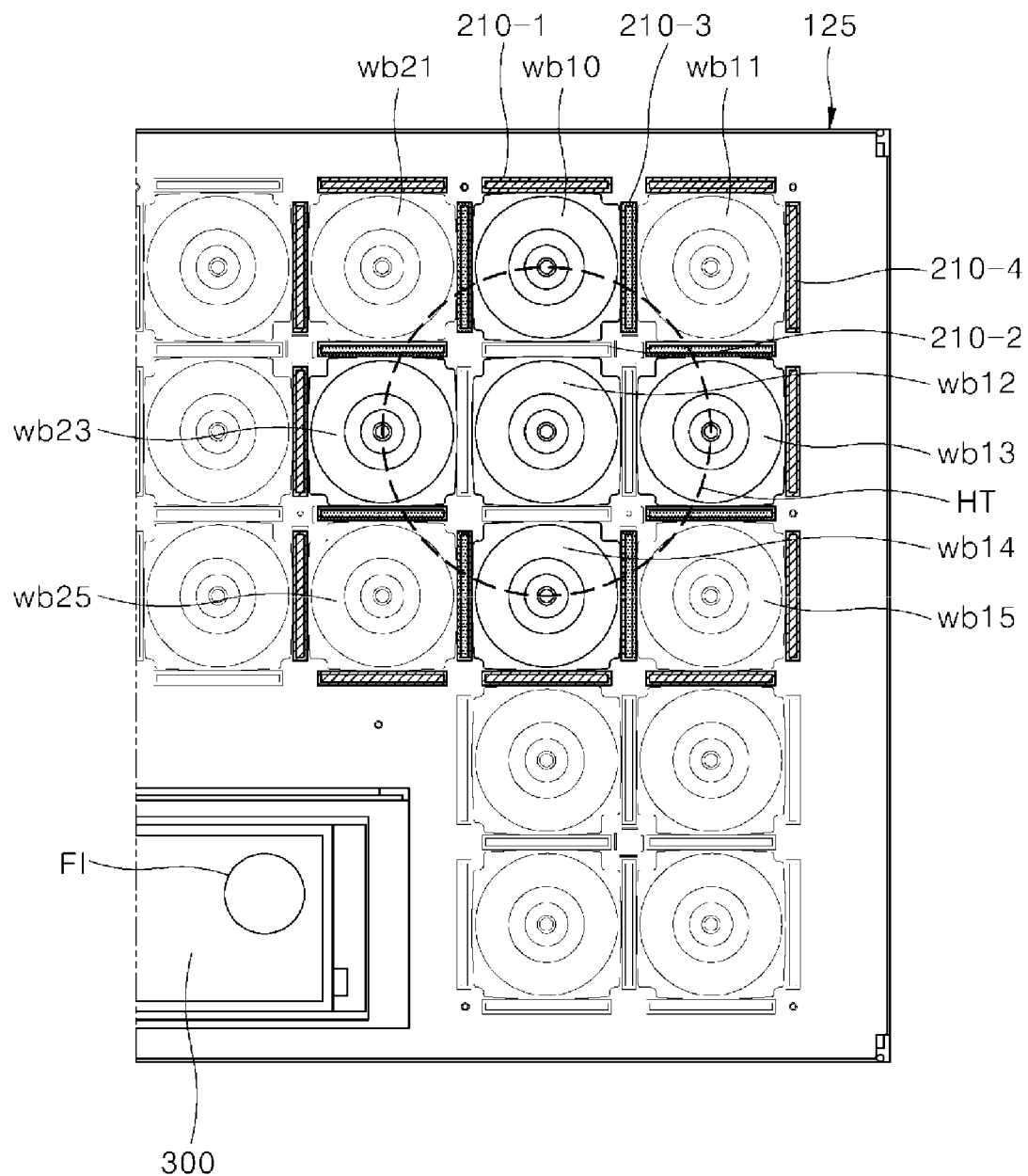
FIGS. 8 to 23 show examples of form compensation algorithms of the induction heating device of FIG. 3.

That is, as shown in FIG. 8, the second control module 320 may turn on the light emitting element arranged below the periphery of the working coils wb10, wb12, wb13, wb14, and wb23 at which the object HT is detected so that a light emitting surface of a light guide (e.g., 210-1, 210-2, and 210-3) located above the light emitting element may be emitted.

However, in the case shown in FIG. 8, as a light emitting pattern of the light guide is a cross (+), the light emitting surface of the light guide is covered by the object HT, and thus, it is difficult to clearly determine an area of the working coil in driving for the object HT.

In order to solve this problem, the second control module 320 analyzes an arrangement form of the working coils wb10, wb12, wb13, wb14, wb23 at which the object HT is detected, among a plurality of working coils based on the information on the detected position of the object HT and performs the form compensation algorithm that controls driving of at least one of the plurality of light emitting elements (e.g., 177) based on the analysis result.

Specifically, when there are working coils (for example, wb23, wb12, and wb13) arranged adjacent to one another in parallel in a same row or working coils (for example, wb10, wb12, and wb14) arranged adjacent to one another in parallel in a same column, the second control module 320 may turn off the light emitting element (for example, the light emitting element arranged below '210-2') arranged between the adjacent working coils.

In some implementations, when the object HT is detected at the working coil (e.g., wb10 and wb13) located at an outermost portion of the cook zone (CZR in FIG. 4), the second control module 320 may always perform a turn-on operation with respect to the light emitting element (for example, a light emitting element arranged at a lower portion of '210-1') arranged in an area in which it vertically overlaps with the outermost portion of the cook zone (CZR of FIG. 4), among light emitting elements arranged below a periphery of the working coils (e.g., wb10 and wb13).

Referring to FIG. 8, when some of the working coils (e.g., wb10 and wb23, wb23 and wb14, wb14 and wb13, and wb13 and wb10) at which the object HT is detected are diagonally arranged adjacent to each other in rows and columns different from each other, the second control module 320 may turn on the light emitting element (for example, the light emitting element arranged below '210-4') arranged below a periphery of the working coil (e.g., wb11) installed in a direction orthogonal to the diagonal direction thereof among the working coils installed around the working coils (e.g., wb10 and wb13) that are diagonally adjacent to each other and may turn off the light emitting element (for example, a light emitting element arranged below '210-3') arranged between the working coils (e.g., wb10 and wb13) diagonally arranged in adjacent to each other and the working coil (e.g., wb11) installed in a direction orthogonal to the diagonal direction thereof.

For example, the first working coil wb10 and the second working coil wb13 are disposed adjacent to each other and arranged along a first diagonal direction crossing different rows and columns defined by the plurality of working coils. In this example, the second control module 320 may be configured to turn on one or more of the plurality of light emitting elements "210-4" arranged vertically below the periphery of a third working coil wb11 that is disposed adjacent the first working coil wb10 and the second working coil wb13 at a position in a second diagonal direction orthogonal to the first diagonal direction, and turn off one or more of the plurality of light emitting elements "210-3" arranged between the first working coil wb10 and the third working coil wb11 and one or more of the plurality of light emitting elements arranged between the second working coil and the third working coil.

Figure 9:
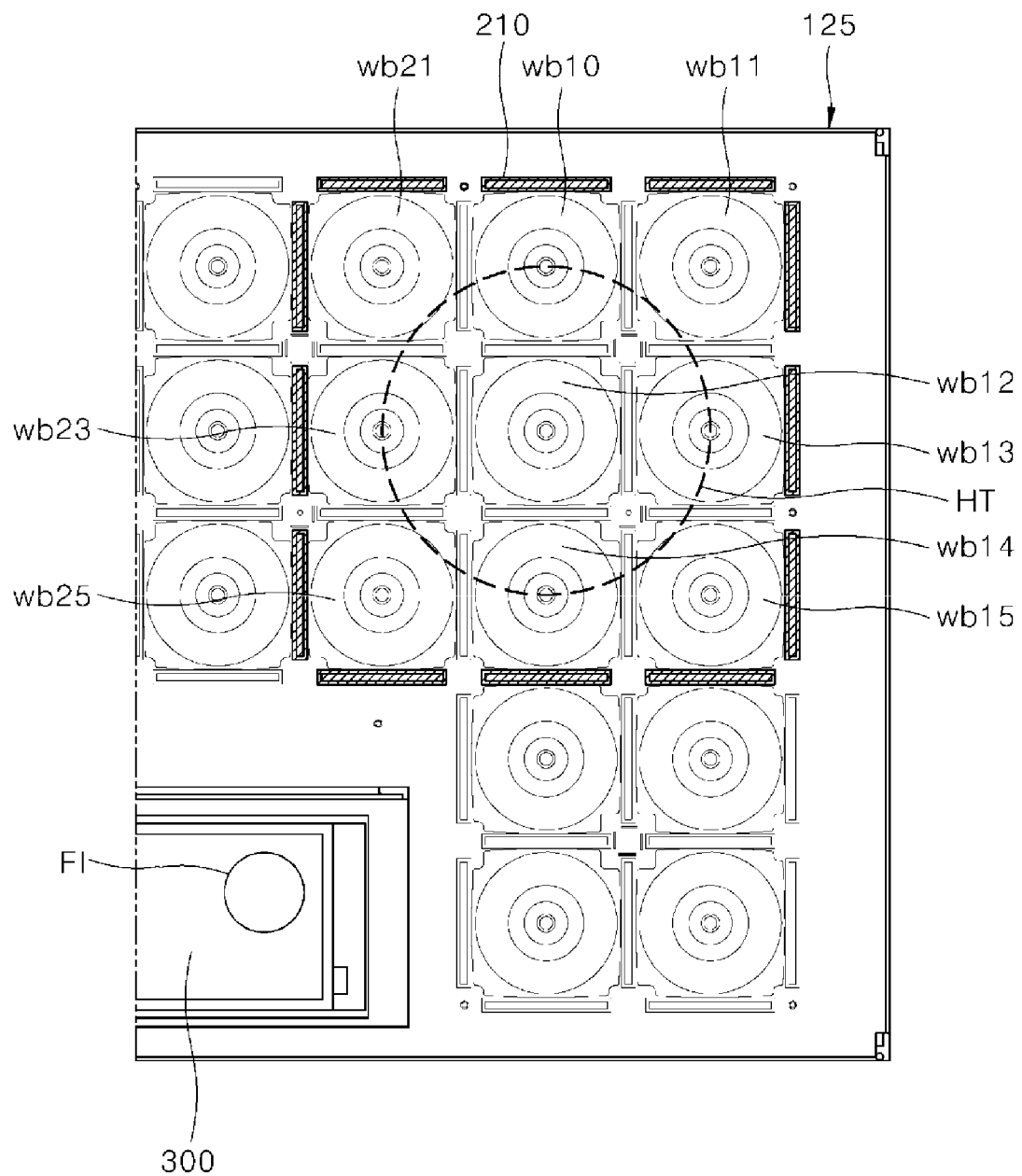

That is, the second control module 320 repeatedly performs the form compensation algorithm described above until the light emitting pattern of the light guide 210 that displays the area at which the object HT is detected becomes a square or a rectangle, thereby implementing a light emitting pattern (a quadrangle pattern) that the user may easily recognize, as shown in FIG. 9. In addition, it is possible to improve the awareness of the user with respect to the area in which the object is detected.

The second control module 320 may control the input interface 300 to display an image of the heating zone for the object FI on the input interface 300.

Specifically, the second control module 320 may control the input interface 300 so that the image of the heating zone for the object FI is displayed on the input interface 300 based on the information on the position of the object HT received from the first control module 310.

Figure 10:
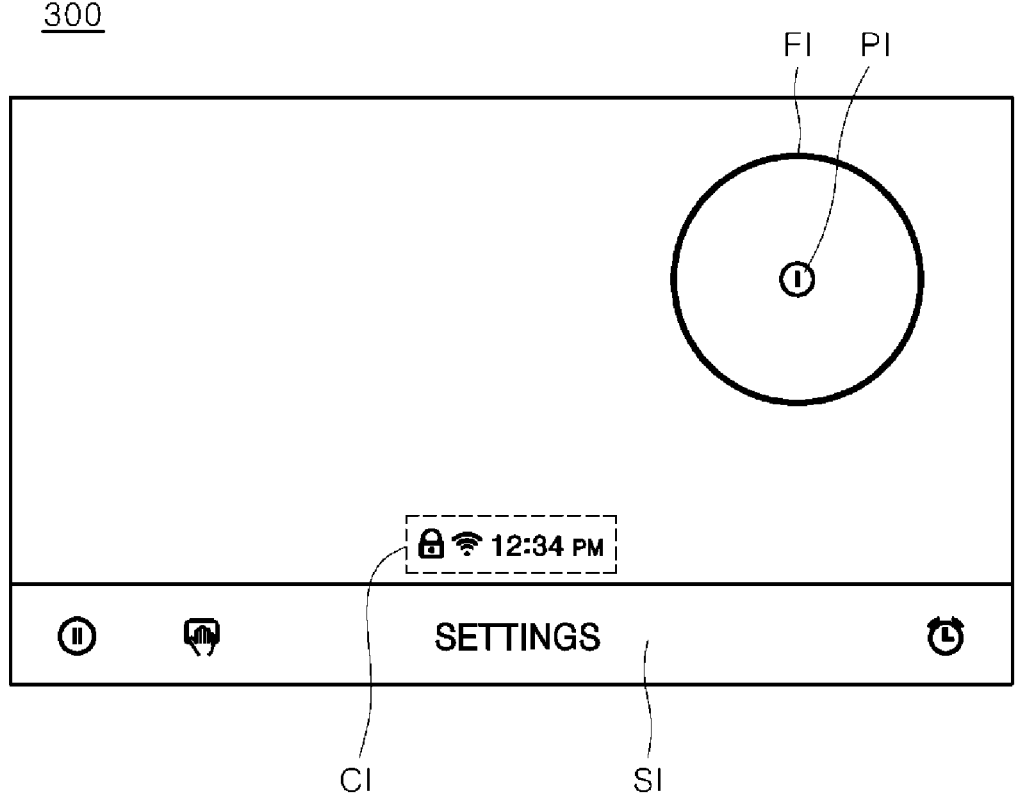

In some implementations, as shown in FIG. 10, for example, the image of the heating zone of the object FI, a setting image SI in which a setting icon (for example, a pause icon, a screen lock icon, a setting list icon, a timer icon, and the like) is displayed, and a sub-image CI in which a sub-icon (for example, a Wi-Fi connection state icon and a current time display icon) is displayed, may be displayed on the input interface 300.

Further, the image of the heating zone for the object FI may be displayed in a specific area of the input interface 300 to correspond to the position of the object HT on the cover plate 119 of FIG. 3 and a size and a rotation direction of the object HT may be reflected and displayed.

That is, the image of the heating zone for the object FI may be displayed in the specific area of the input interface 300 corresponding to an actual position on the object HT of the upper plate 115 of FIG. 3 based on scale of the input interface 300 compared to the upper plate 115 of FIG. 3 of the cover plate 119 of FIG. 3.

Further, a power image (e.g., PI) or an image of the heating intensity (e.g., PL2 of FIG. 13) and a timer image (e.g., T2 of FIG. 13) may be displayed at a central region of the image of the heating zone for the object FI.

However, for convenience of explanation, FIG. 10 shows a form in which a power image PI is displayed at the central region of the image of the heating zone for the object FI.

In some implementations, only the setting image SI and a sub-image CI may be displayed on the input interface 300 before the object is arranged on the upper plate (115 of FIG. 3) when the power of the induction heating device 1 is turned on.

However, as shown in FIG. 10, when the object is arranged on the upper plate (115 in FIG. 1) and the position of the object is detected by the first control module 310, the image of the heating zone for the object (e.g., FI) and the power image (e.g., PI) may additionally be displayed on the input interface 300.

Further, when the user touches the power image displayed at the central region of the image of the heating zone for the object, the image of the heating intensity (e.g., PL2 of FIG. 13) and a timer image (e.g., T2 of FIG. 13) may be displayed at the central region of the image of the heating zone for the object (e.g., FI).

As described above, the image of the heating zone for the object FI may be displayed on the input interface 300 through the above-described method.

That is, the induction heating device 1 visually provides the user with the area in which the object HT is detected through the input interface 300 and the indicator, thereby improving the accuracy in arranging the object, by the user.

Then, referring to FIGS. 7, and 11 to 13, a second example method of controlling, by the induction heating device 1 of FIG. 1, a light emitting element based on a form compensation algorithm is shown.

In some implementations, the contents described above in FIGS. 8 to 10 are briefly mentioned below.

Specifically, when the first and second objects HT1 and HT2 are arranged on the upper plate 115 of FIG. 3 of the cover plate 119, the first control module 310 may detect which of the plurality of working coils seats the first and second objects HT1 and HT2 thereabove.

When the positions of the first and second objects HT1 and HT2 are detected (that is, the first object HT1 is detected above the working coils wa13 to wa15 and the second object HT2 is detected above the working coils wb10 to wb15, wb21, and wb23), the first control module 310 may provide the second control module 320 with the information on the detected position of each of the first and second objects HT1 and HT2.

The second control module 320 may turn on the light emitting element arranged blow the periphery of the working coils (wa13 to wa15 and wb10 to wb15, wb21, and wb23) at which the first and second objects HT1 and HT2 are detected based on the information on the position of each of the first and second objects HT1 and HT2 received from the first control module 310.

Then, when there are working coils (e.g., wa14 and wa15) arranged adjacent to each other in parallel in the same row or working coils (e.g., wb13, wb15) arranged adjacent to each other in parallel in the same column, the second control module 320 may turn off the light emitting element arranged between the adjacent working coils.

Figure 11:
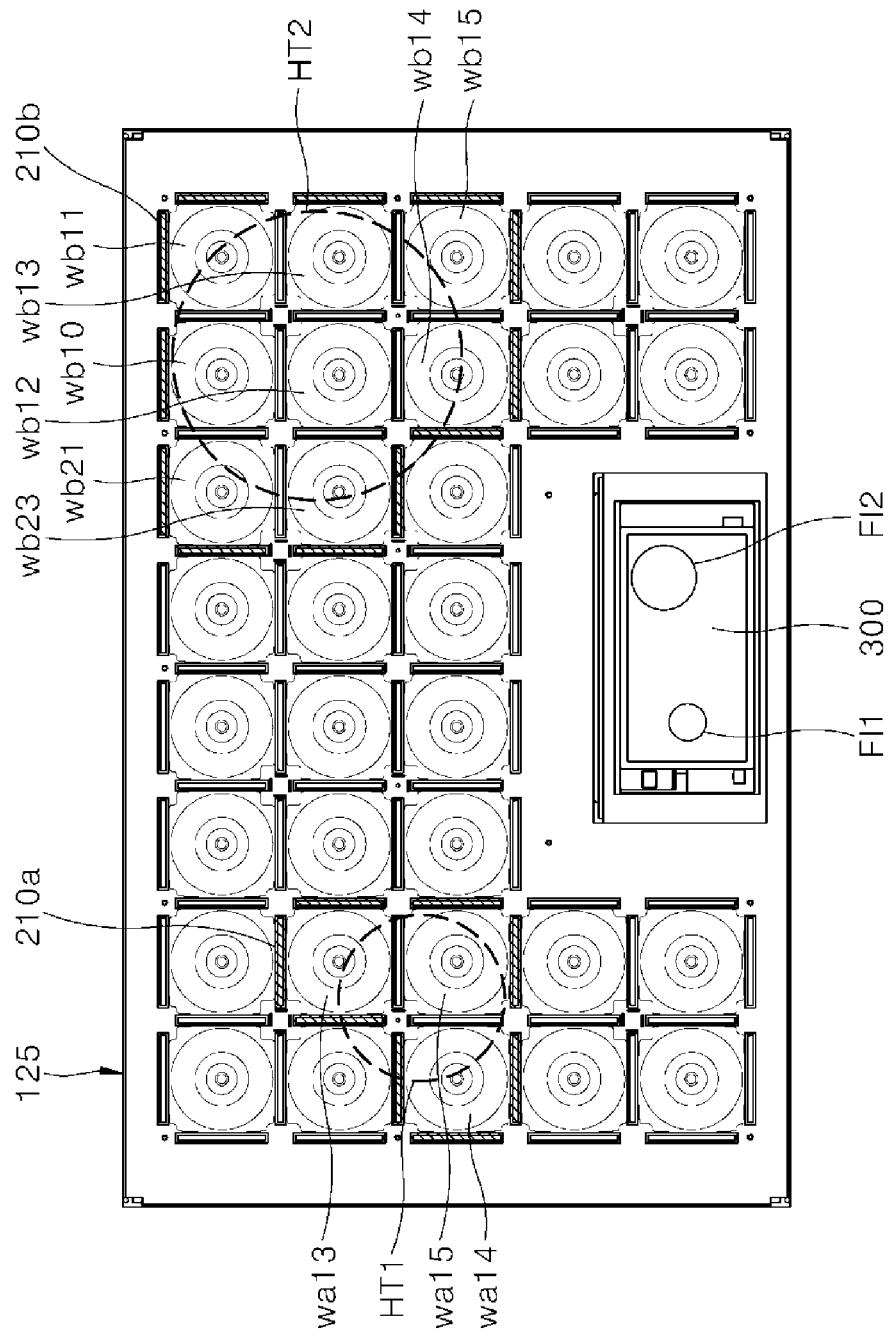
Figure 12:
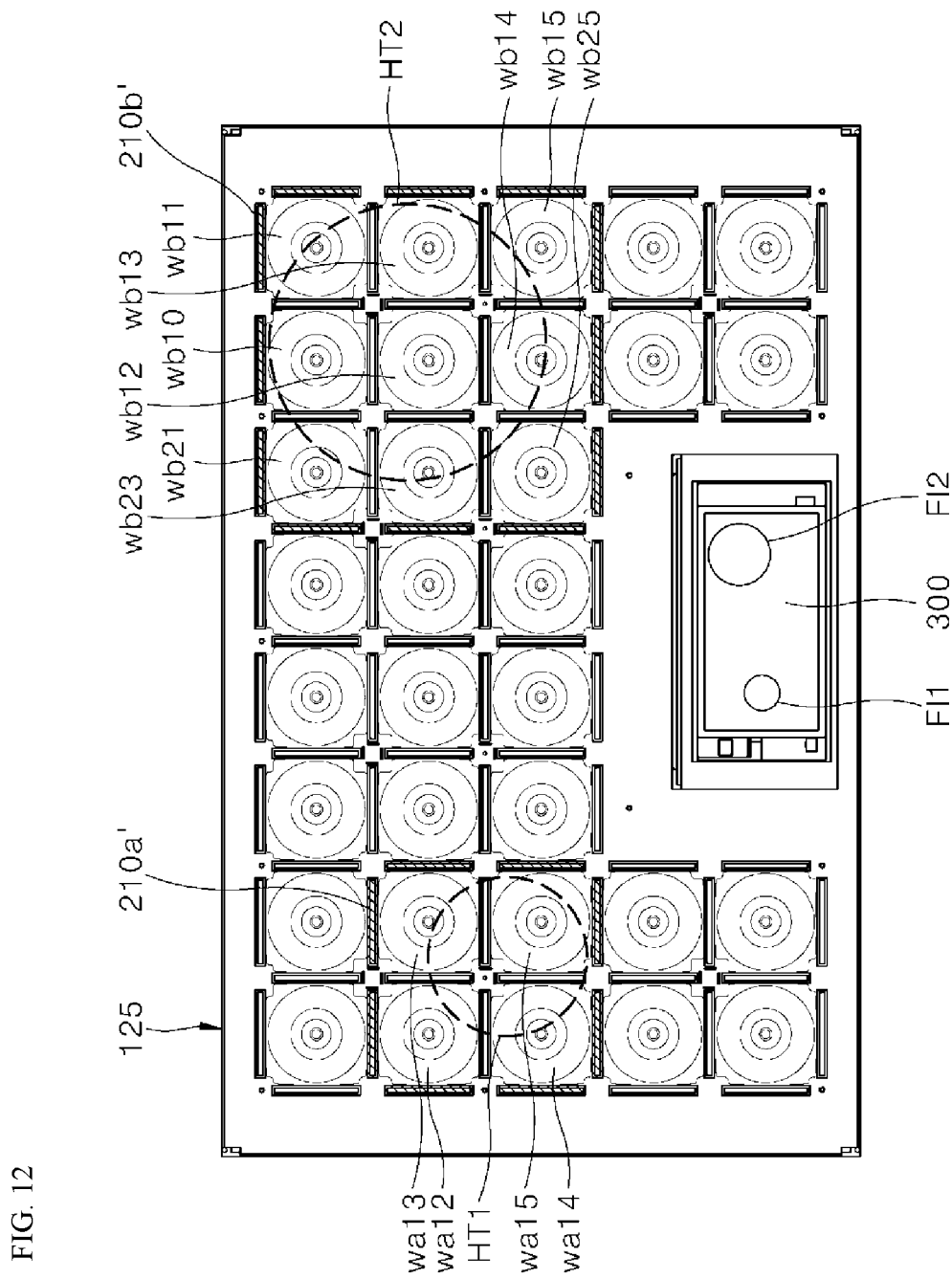

That is, as shown in FIG. 11, when the second control module 320 turns on or turns off the light emitting element arranged below the periphery of the working coils wa13 to wa15 and wb10 to wb15, wb21, and wb23 at which the first and second objects HT1 and HT2 are detected so that the light emitting surface of the light guide (e.g., 210a and 210b) arranged above the light emitting elements may be emitted.

In the case shown in FIG. 11, however, it is difficult for the user to clearly determine the working coil area in driving for the first and second objects HT1 and HT2 because the light emitting pattern of the light guide is stepped.

In order to solve this problem, when some of the working coils (for example, wa13 and wa14, and wb23 and wb14) at which the first and second objects HT1 and HT2 are detected are diagonally arranged adjacent to each other in different rows and columns from each other, the second control module 320 may turn on the light emitting element arranged below the periphery of the working coils (e.g., wa12 and wb25) installed in a direction orthogonal to the diagonal direction thereof, of the working coils installed around the working coils (e.g., wa13 and wa14, and wb23 and wb14) diagonally arranged adjacent and may turn on the light emitting element arranged between the working coils (e.g., wa13 and wa14, and wb23 and wb14) diagonally arranged adjacent to each other and the working coils (e.g., wa12 and wb25) installed in a direction orthogonal to the diagonal direction thereof.

That is, the second control module 320 repeatedly performs the above-mentioned form compensation algorithm until the light emitting pattern of the light guides 210a and 210b that display the area in which the first and second objects HT1 and HT2 are detected becomes a square or a rectangular, thereby implementing the light emitting pattern (that is, the light emitting patterns of the light guides 210a' and 210b') the user may easily recognize.

Further, the second control module 320 may control the input interface 300 so that the first and second images of the heating zone for the object FI1 and FI2 are displayed on the input interface 300.

Specifically, the second control module 320 may control the input interface 300 so that the first and second images of the heating zone for the object FI1 and FI2 are displayed on the input interface 300 based on the information on the position of each of the first and second objects HT1 and HT2 received from the first control module 310.

Figure 13:
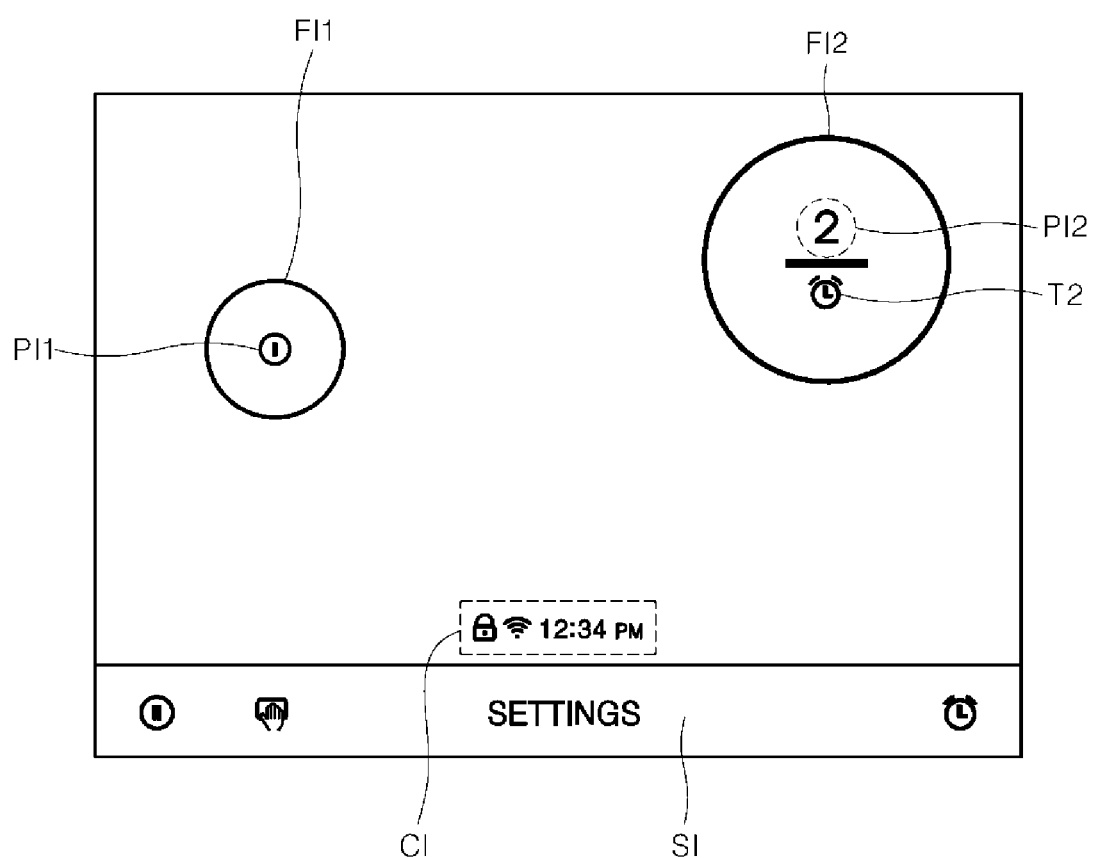

In some implementations, FIG. 13 shows that a power image PI1 is displayed at a central region of a first image of the heating zone for the object FI1 and an image of the heating intensity PL2 and a timer image T2 are displayed at a central region of a second image of the heating zone for the object FI2.

Then, referring to FIGS. 7 and 14 to 16, a third example method of controlling, by the induction heating device 1 of FIG. 1, a light emitting element based on a form compensation algorithm is shown.

Specifically, when the first to third objects HT1 to HT3 are arranged on the upper plate 115 of FIG. 3 of the cover plate 119 of FIG. 3, a first control module 310 may detect which of the plurality of working coils seats the first to third objects HT1 to HT3 thereabove.

The positions of the first to third objects HT1 to HT3 are detected (that is, the first object HT1 is detected above the working coils wa11 to wa15, wa20 and wa22, and the object HT2 is detected above the working coils wb10, wb12, wb13, wb14 and wb23, and the third object HT3 is detected above the working coils wa00 and wa03), the first control module 310 may provide the second control module 320 with information on the detected position of each of the first to third objects HT1 to HT3.

The second control module 320 may turn on the light emitting element arranged below the periphery of the working coils wa11 to wa15, wa20, wa22, wb10, wb12, wb13, wb14, wb23, wa00, and wa03 at which the first and third objects HT1 to HT3 are detected based on the information on the position of each of the first to third objects HT1 to HT3 received from the first control module 310.

Then, when there are working coils (e.g., wa12 and wa13) arranged adjacent to each other in the same row or working coils (e.g., wb12 and wb14) arranged adjacent to each other in the same row, the second control module 320 may turn off the light emitting element arranged between the adjacent working coils.

Figure 14:
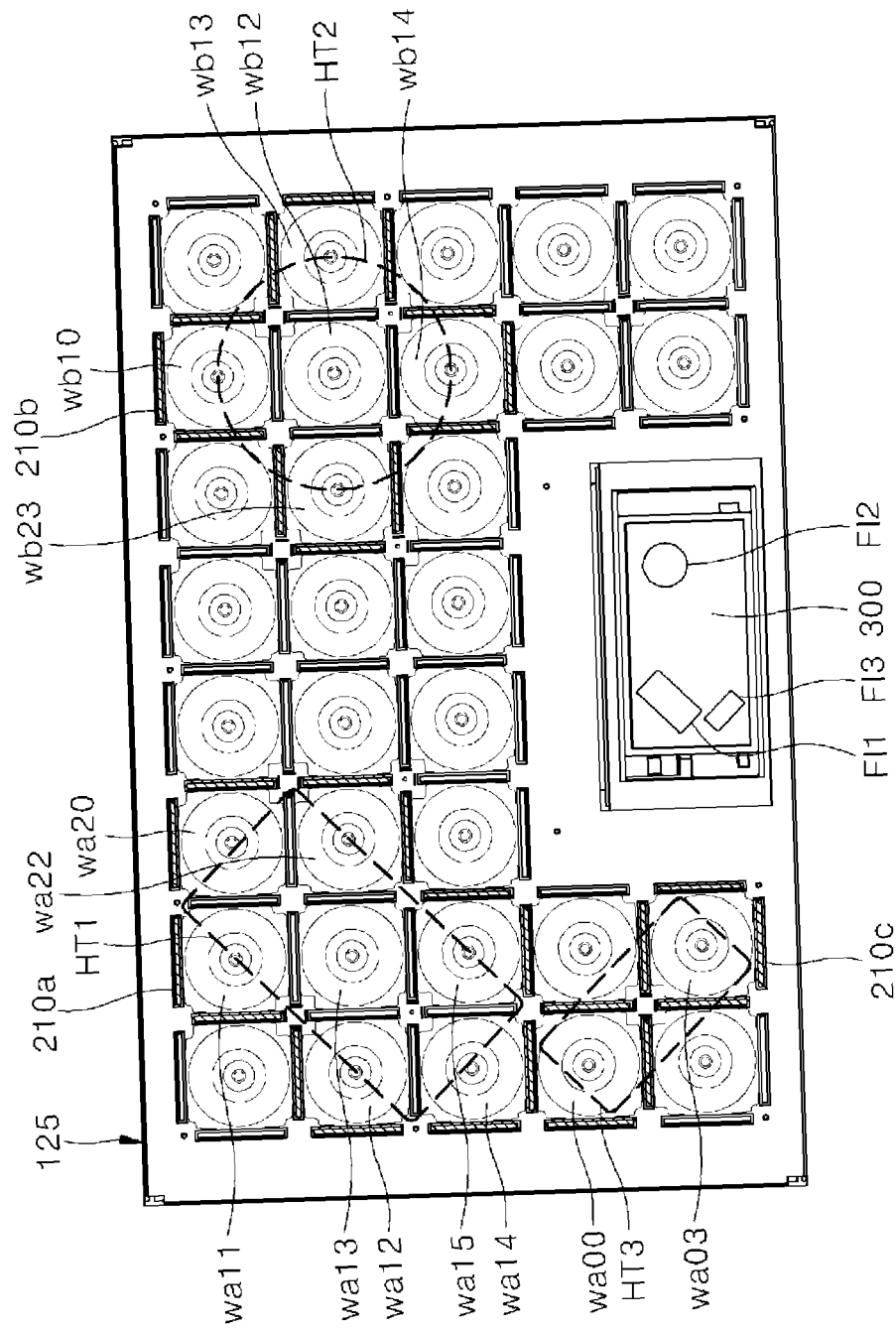
Figure 15:
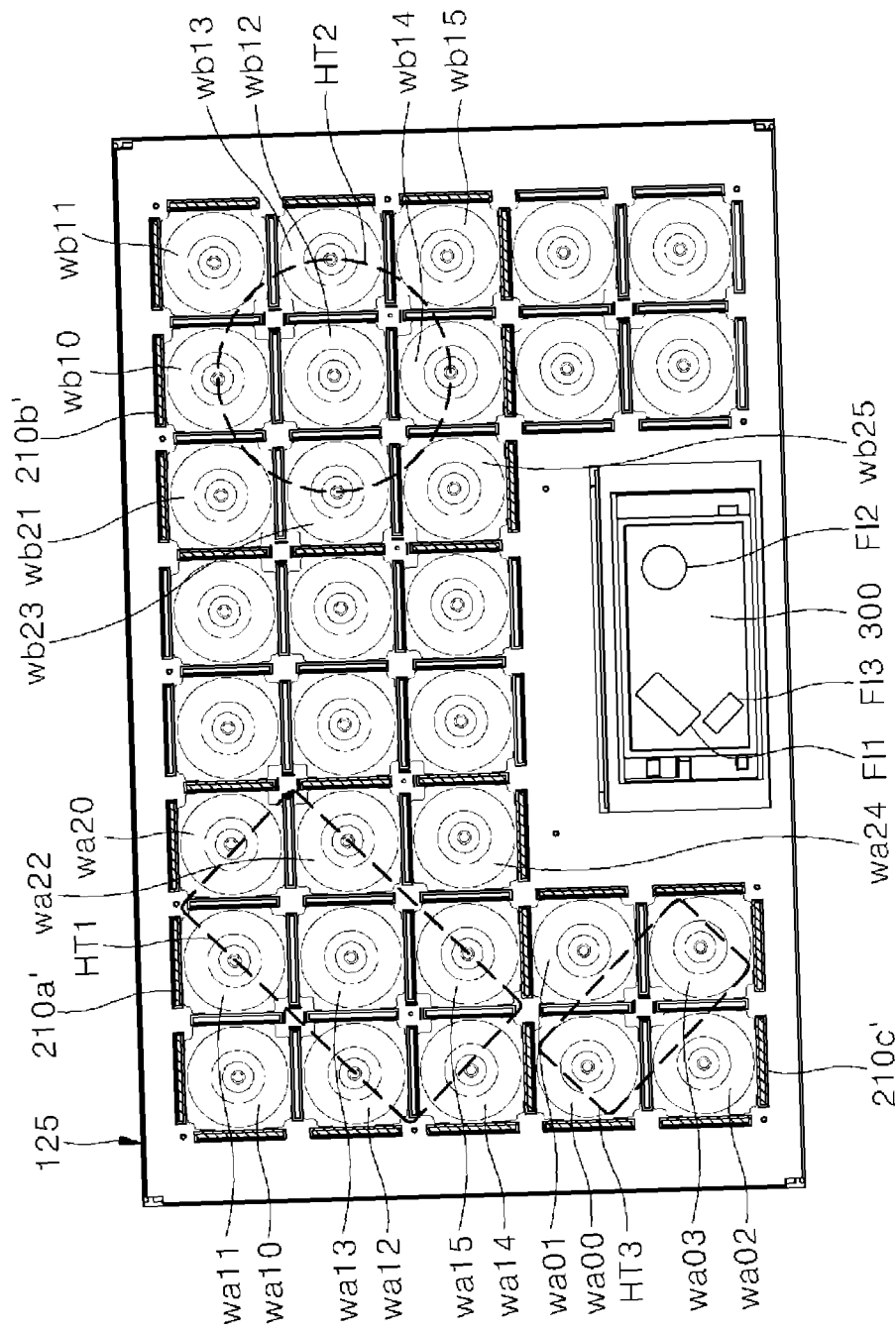

That is, as shown in FIG. 14, the second control module 320 may turn on or turn off the light emitting element arranged below the periphery of the working coils wa11 to wa15, wa20, wa22, wb10, wb12, wb13, wb14, wb23, wa00, and wa03 at which the first and third objects HT1 to HT3 are detected, respectively, so that the light emitting surface of the light guide (e.g., 210a, 210b, and 210c) arranged above the light emitting element may be emitted.

However, in the case shown in FIG. 14, as the light emitting pattern of the light guide is stepped or crossed (+), the user may not clearly determine the area of the working coil in driving for the first to third objects HT1 to HT3.

In order to solve such a problem, when some of the working coils (for example, wa11 and wa12, wa22 and wa15, wb10 and wb23, wb23 and wb14, wb14 and wb13, wb13 and wb10, and wa00 and wa03) at which the first to third objects HT1 to HT3 are detected are diagonally arranged adjacent to each other in different rows and columns from each other, the second control module 320 may turn on the light emitting element arranged below the periphery of the working coils (e.g., wa10, wa24, wb21, wb25, wb15, wb11, wa01, and wa02) installed in a direction orthogonal to the diagonal direction, among working coils installed around the working coils (e.g., wa11 and wa12, wa22 and wa15, wb10 and wb23, wb23 and wb24, wb14 and wb13, wb13 and wb10, and wa00 and wa03) diagonally arranged adjacent to each other and may turn off the light emitting element arranged between working coils diagonally arranged adjacent to each other (e.g., wa11 and wa12, wa22 and wa15, wb10 and wb23, wb23 and wb14, wb14 and wb13, wb13 and wb10, wa00 and wa03) and the working coils (e.g., wa10, wa24, wb21, wb25, wb15, wb11, wa01, and wa02) installed in the direction orthogonal to the diagonal direction.

In some implementations, when some of the objects (for example, the first and third objects HT1 and HT3) are arranged adjacent to each other, some of the working coils related to the objects (e.g., wa14 and wa00, and wa15 and wa01) may be arranged adjacent to each other.

In this case, the second control module 320 may turn on the light emitting elements arranged between adjacent working coils (e.g. wa14 and wa00, and wa15 and wa01).

In summary, when the working coils (or working coils related to a specific object (i.e., the third object HT3), for example, wa01) occupied by different objects from each other are arranged adjacent to each other, the second control module 320 turns on the light emitting element arranged between the working coils without turning off the light emitting element, so that the user may easily distinguish the area in which the object is detected.

That is, the second control module 320 repeatedly performs the above-mentioned form compensation algorithm until the light emitting pattern of the light guides 210a, 210b, and 210c that display the area in which the first to third objects HT1 to HT3 are detected becomes a square or a rectangle, thereby implementing the light emitting pattern (that is, the light emitting pattern of the light guides 210a', 210b', and 210c') the user may easily recognize.

Further, the second control module 320 may control the input interface 300 so that the first to third images of the heating zone for the object FI1 to FI3 are displayed on the input interface 300.

Specifically, the second control module 320 may control the input interface 300 so that the first and third images of the heating zone for the object FI1 to FI3 are displayed on the input interface 300 based on the information on the position of each of the first to third objects HT1 to HT3 received from the first control module 310.

Figure 16:
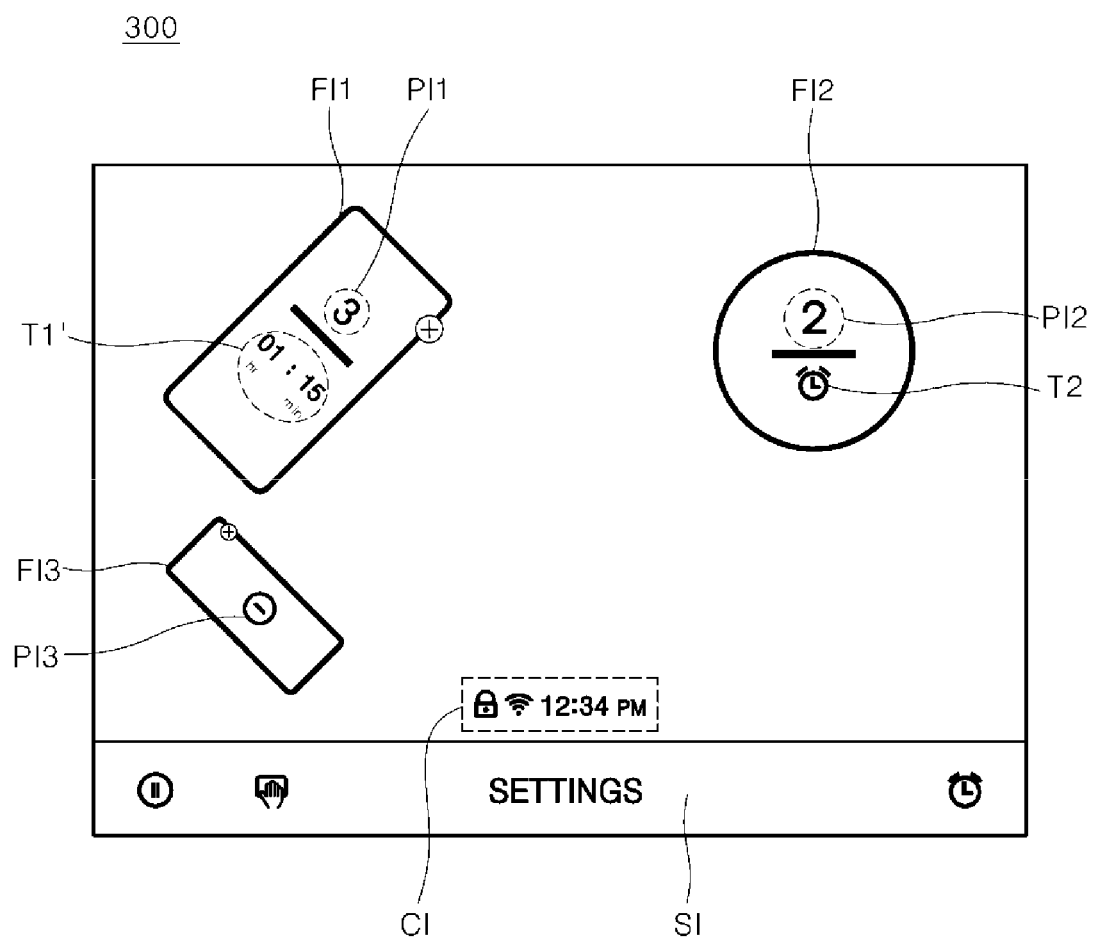

In some implementations, FIG. 16 shows that an image of the heating intensity PL1 and a changed timer image T1' (i.e., a timer image displaying remaining cooking time) are displayed at the central region of the first image of the heating zone for the object FI1, and the image of the heating intensity PL2 and the timer image T2 are displayed at the central region of the second image of the heating zone for the object FI2 and the power image PI3 is displayed at the central region of the third image of the heating zone for the object FI3.

Then, referring to FIGS. 7 and 17 to 19, a fourth example method of controlling, by the induction heating device 1 of FIG. 1, a light emitting element based on a form compensation algorithm.

Specifically, when the first to third objects HT1 to HT3 are arranged on the upper plate 115 of FIG. 3 of the cover plate 119 of FIG. 3, the first control module 310 may detect which of the plurality of working coils seats the first to third objects HT1 to HT3 thereabove.

The positions of the first to third objects HT1 to HT3 are detected (that is, the first object HT1 is detected above the working coils wa15, wa24, and wa01 the second object HT2 is detected above the working coil wb24 and the third object HT3 is detected above the working coils wb10, wb12, wb13, wb14 and wb23), the first control module 310 may provide the second control module 320 with information on the detected position of each of the first to third objects HT1 to HT3.

The second control module 320 may turn on the light emitting element arranged below the periphery of the working coils (wa15, wa24, wa01 and wb24, wb10, wb12, wb13, wb14, and wb23) at which the first to third objects HT1 to HT3 are detected, respectively, based on the information on the position of each of the first to third objects HT1 to HT3 received from the first control module 310.

Then, when there are working coils (e.g., wa15 and wa24) arranged adjacent to each other in the same row or working coils (e.g., wb12 and wb14) arranged adjacent to each other in the same column in parallel, the second control module 320 may turn off the light emitting elements arranged between the adjacent working coils.

Figure 17:
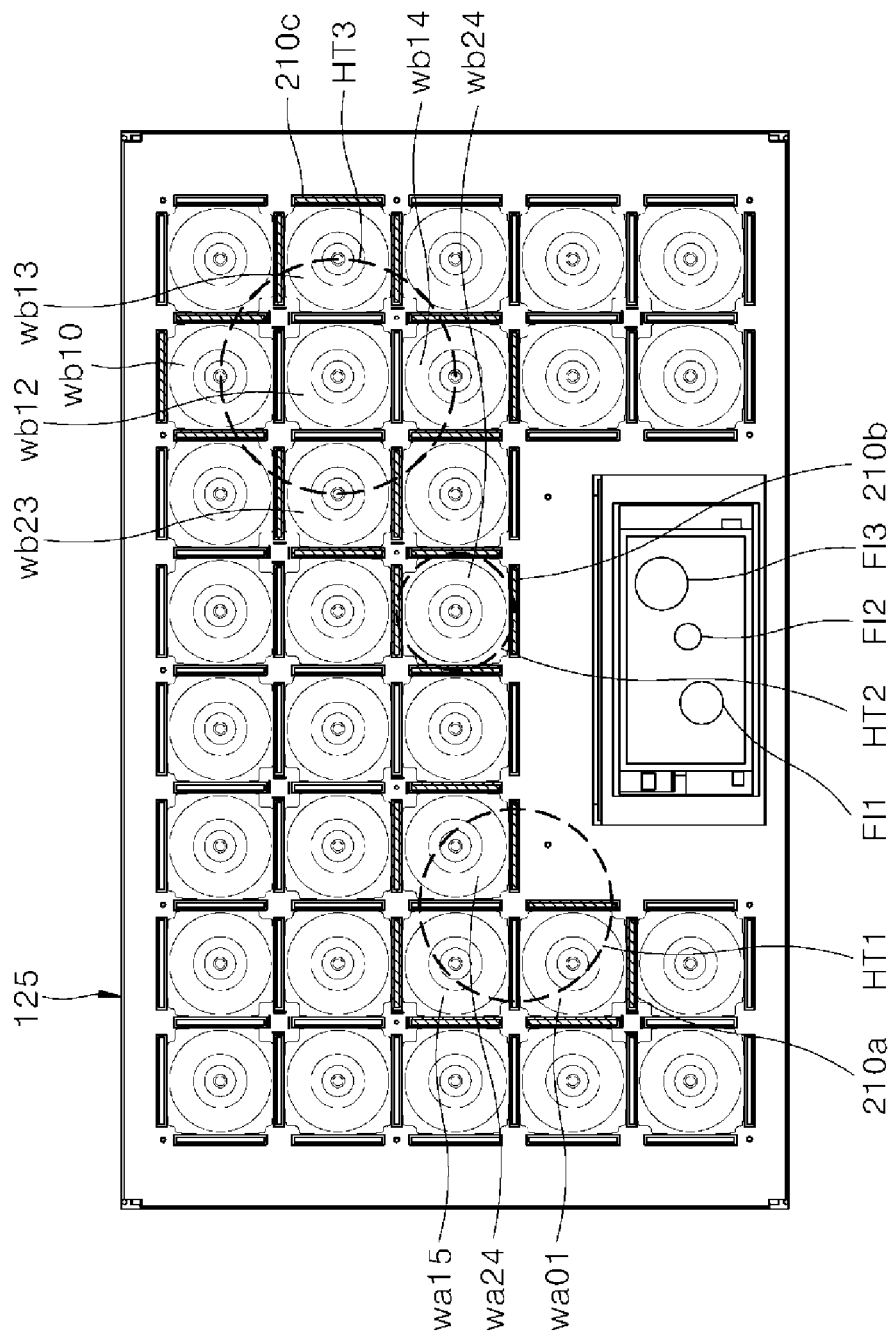
Figure 18:
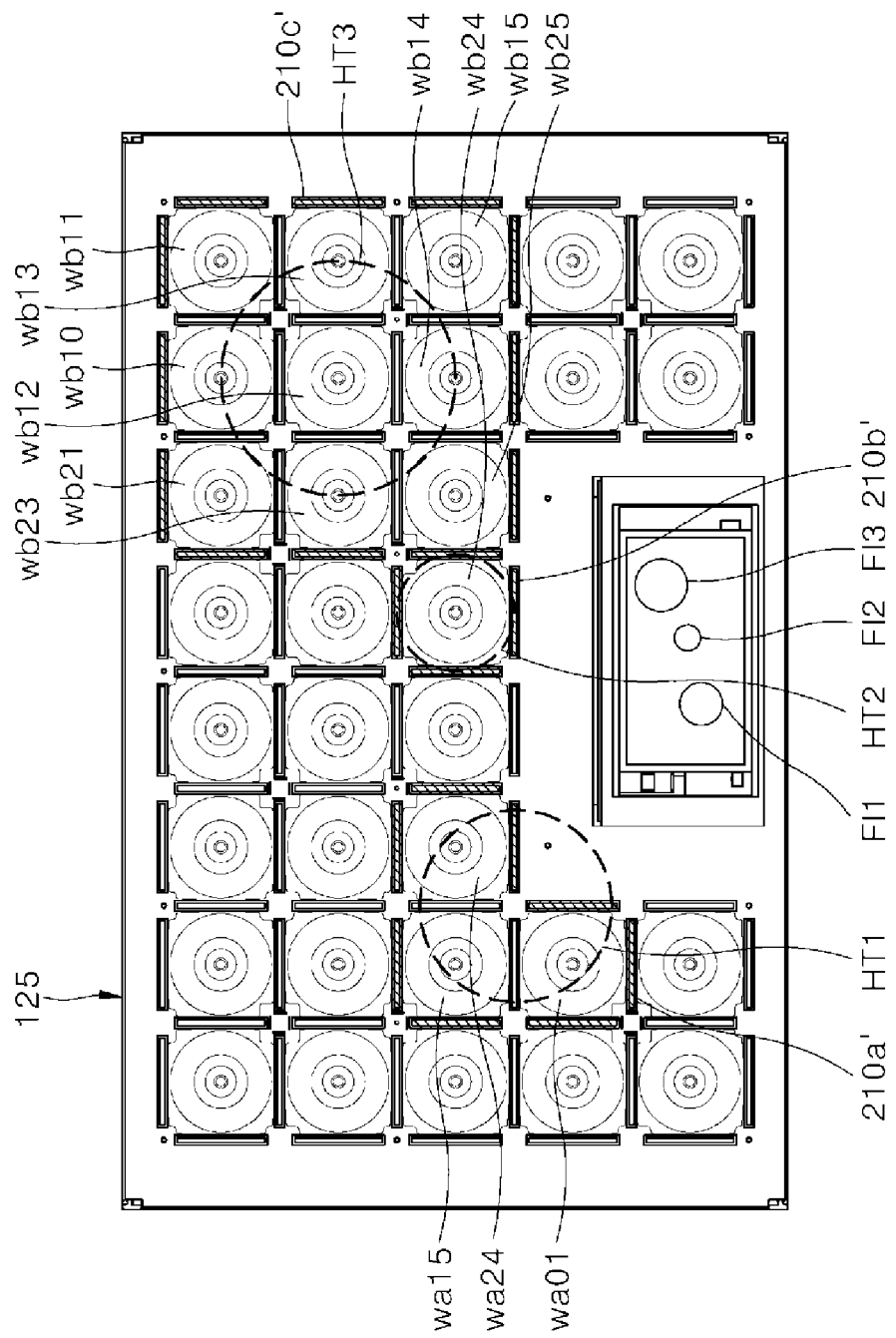

That is, as shown in FIG. 17, the second control module 320 may turn on or turn off the light emitting element arranged below the periphery of the working coils wa15, wa24, and wa01, wb24, and wb10, wb12, wb13, wb14, and wb23 at which the first to third objects HT1 to HT3 are detected, respectively, so that the light emitting surface of the light guide (e.g., 210a, 210b, and 210c) arranged above the light emitting element may be emitted.

However, in the case shown in FIG. 17, as the light emitting pattern of the light guide is stepped or crossed (+), the user may be difficult to clearly determine the working coil area in driving for the first to third objects HT1 to HT3.

In some implementations, when some of the working coils (e.g., wa24 and wa01, wb10 and wb23, wb23 and wb14, wb14 and wb13, and wb13 and wb10) at which the first to third objects HT1 to HT3 are detected are diagonally arranged adjacent to each other in different rows and columns from each other, the second control module 320 may turn on the light emitting element arranged below the periphery of the working coils (e.g., wb21, wb25, wb15, and wb11) installed in a direction orthogonal to the diagonal direction thereof, among working coils installed around the working coils that are diagonally arranged adjacent to each other (e.g., wa24 and wa01, wb10 and wb23, wb23 and wb14, wb14 and wb13, and wb13 and wb10) and may turn off the light emitting element arranged between each of the working coils diagonally arranged adjacent to each other (e.g., wa24 and wa01, wb10 and wb23, wb23 and wb14, wb14 and wb13, and wb13 and wb10) and the working coils installed in a direction orthogonal to the diagonal direction (e.g., wb21, wb25, wb15, and wb11).

In some implementations, in the case of some working coils (e.g., wa24 and wa01) among the working coils diagonally arranged adjacent, the working coil (e.g., wa15) installed in the direction orthogonal to the diagonal direction thereof may already be turned on or may not be present.

That is, the second control module 320 may repeatedly performs the above-mentioned form compensation algorithm until the light emitting pattern of the light guides 210a, 210b, and 210c that display the area in which the first to third objects HT1 to HT3 are detected becomes the square or the rectangle, thereby implementing the light emitting pattern the user may easily recognize (that is, the light emitting pattern of the light guides 210a', 210b', and 210c').

Further, the second control module 320 may control the input interface 300 so that the first to third images of the heating zone for the object FI1 to FI3 are displayed on the input interface 300.

Specifically, the second control module 320 may control the input interface 300 so that the first to third images of the heating zone for the object FI1 to FI3 are displayed on the input interface 300 based on the information on the position of each of the first and third objects HT1 to HT3 received from the first control module 310.

Figure 19:
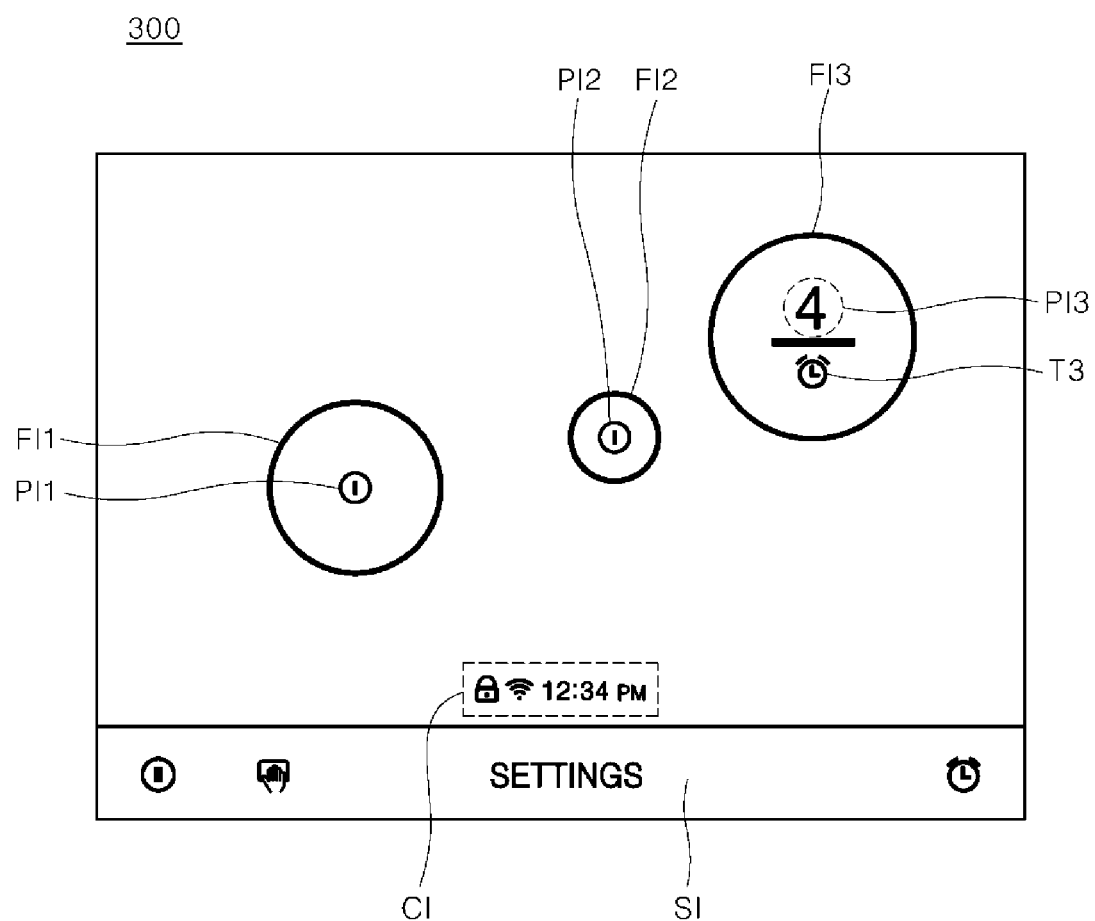

In some implementations, FIG. 19 shows that the power image PI1 is displayed at the central region of the first image of the heating zone for the object FI1 and the power image PI2 is displayed at the central region of the second image of the heating zone for the object FI2, and an image of the heating intensity PL3 and the timer image T3 are displayed at the central region of the third image of the heating zone for the object FI3.

Figure 20:
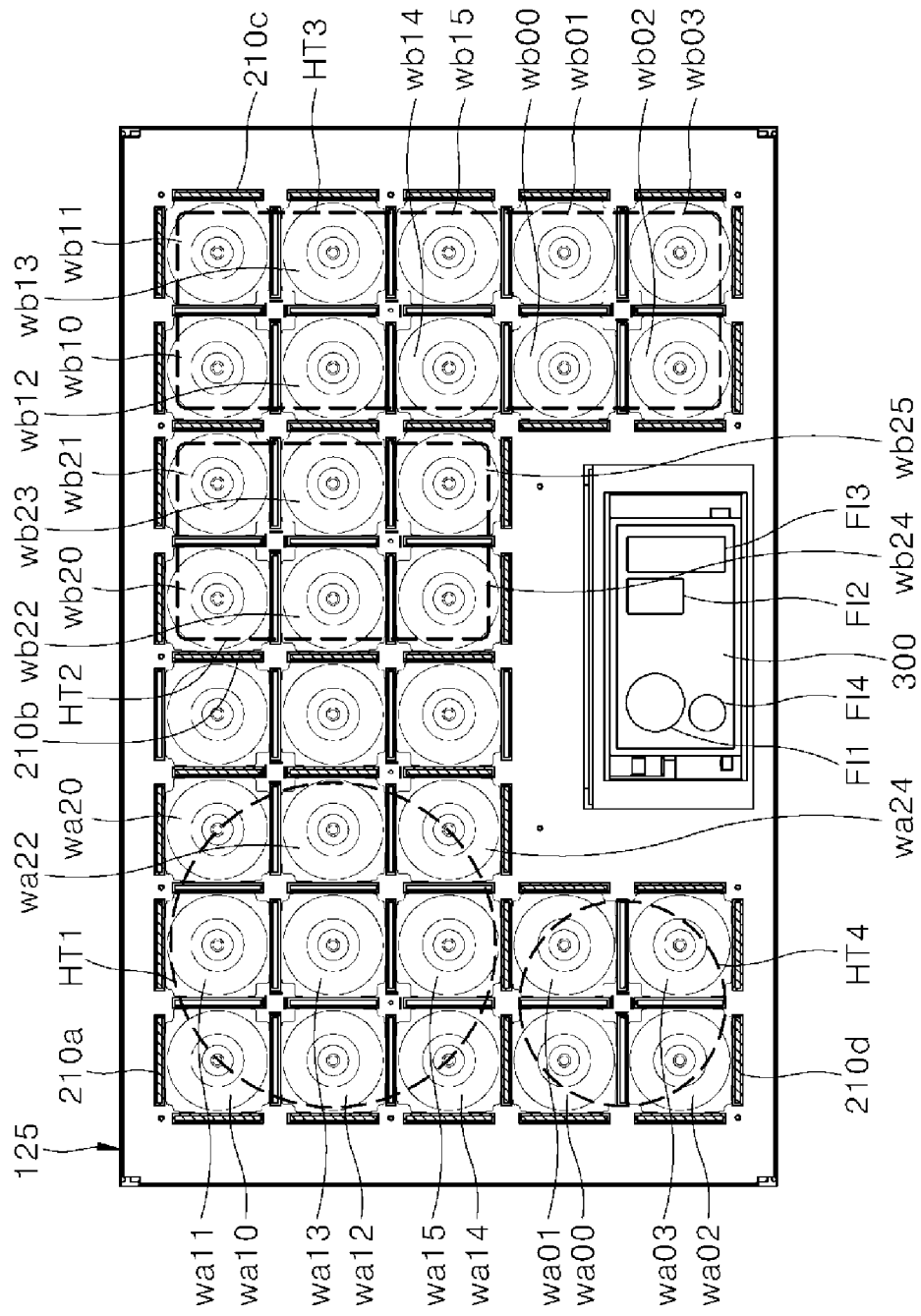
Figure 21:
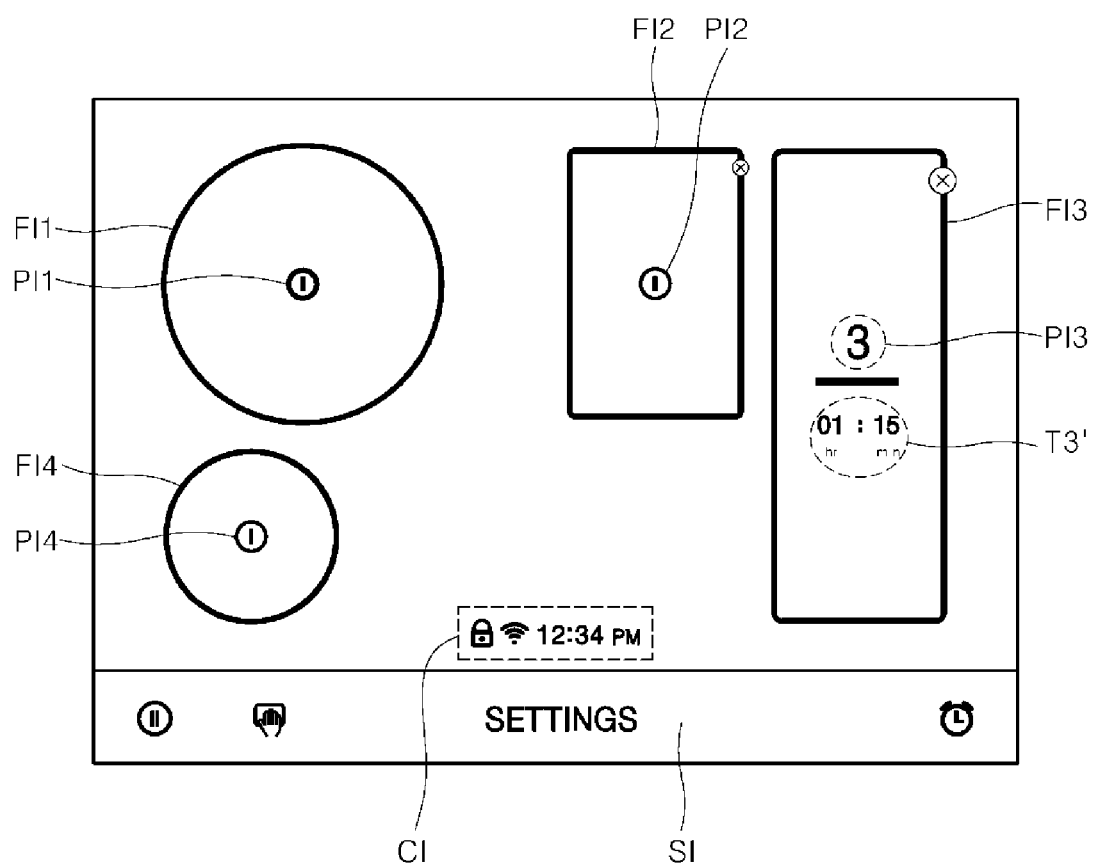

Referring to FIGS. 7, 20 and 21, a fifth example method of controlling, by the induction heating device 1 of FIG. 1, a light emitting element based on a form compensation algorithm is shown.

Specifically, when the first to fourth objects HT1 to HT4 are arranged on the upper plate 115 of FIG. 3 of the cover plate 119 of FIG. 3, the first control module 310 may detect which of a plurality of working coils seats the first to fourth objects HT1 to HT4 there above.

The positions of the first to fourth objects HT1 to HT4 are detected (that is, the first object HT1 is detected above the working coils wa10 to wa15, wa20, wa22, wa24, and the object HT2 is detected above the working coils wb20 to wb25 and the third object HT3 is detected above the working coils wb10 to wb15 and wb00 to wb03, and the fourth object HT4 is detected above the working coils wa00 to wa03, the first control module 310 may provide the second control module 320 with the information on the detected position of each of the first to fourth objects HT1 to HT4.

The second control module 320 may turn on the light emitting element arranged below the periphery of the working coils wa10 to wa15, wa20, wa22, and wa24, wb20 to wb25, wb10 to wb15, and wb00 to wb03, and wa00 to wa03 at which the first to fourth objects HT1 to HT4 are detected based on the information on the position of each of the first to fourth objects HT1 to HT4 received from the first control module 310.

Then, when there are working coils (e.g., wa10 and wa11) arranged adjacent to each other in the same row or working coils (e.g., wb10 and wb12) arranged adjacent to each other in the same column, the second control module 320 may turn off the light emitting elements arranged between the adjacent working coils.

That is, as shown in FIG. 20, the second control module 320 may turn on or turn off the light emitting element arranged below the periphery of the working coils wa10 to wa15, wa20, wa22, and wa24, wb20 to wb25, wb10 to wb15 and wb00 to wb03, and wa00 to wa03 at which the first to fourth objects HT1 to HT4 are detected, so that the light emitting surface of the light guides (e.g., 210a, 210b, 210c, and 210d) arranged above the light emitting elements may be emitted.

In some implementations, when some objects (for example, the first and fourth objects HT1 and HT4, the second and the third objects HT2 and HT3) are arranged adjacent to each other, some of the working coils (e.g., wa14 and wa00, wa15 and wa01, wb21 and wb10, wb23 and wb12, and wb25 and wb14) of which each object is detected may be arranged adjacent to each other.

In this case, the second control module 320 may turn on the light emitting element arranged between the working coils (e.g., wa14 and wa00, wa15 and wa01, wb21 and wb10, wb23 and wb12, and wb25 and wb14) arranged in adjacent to each other.

That is, when the working coils occupied by the different objects from each other are arranged adjacent to each other, the second control module 320 turns on the light emitting elements arranged between the working coils without turning them off, so that the user may easily distinguish the area in which the object is detected.

Further, the second control module 320 may control the input interface 300 so that the first to fourth images of the heating zone for the object FI1 to FI4 are displayed on the input interface 300.

Specifically, the second control module 320 may control the input interface 300 so that the first to fourth images of the heating zone for the object FI1 to FI4 are displayed on the input interface 300 based on the information on the position of each of the first to fourth objects HT1 to HT4 received from the first control module 310.

In some implementations, FIG. 21 shows that a power image PI1 is displayed at a central region of a first image of a heating zone for an object FI1, and a power image PI2 is displayed at a central region of a second image of the heating zone for the object FI2, an image of heating intensity PL3 and a modified timer image T3' are displayed at a central region of a third image of a heating zone for an object FI3 and a power image PI4 is displayed at a central region of a fourth image of a heating zone for an object FI4.

Figure 22:
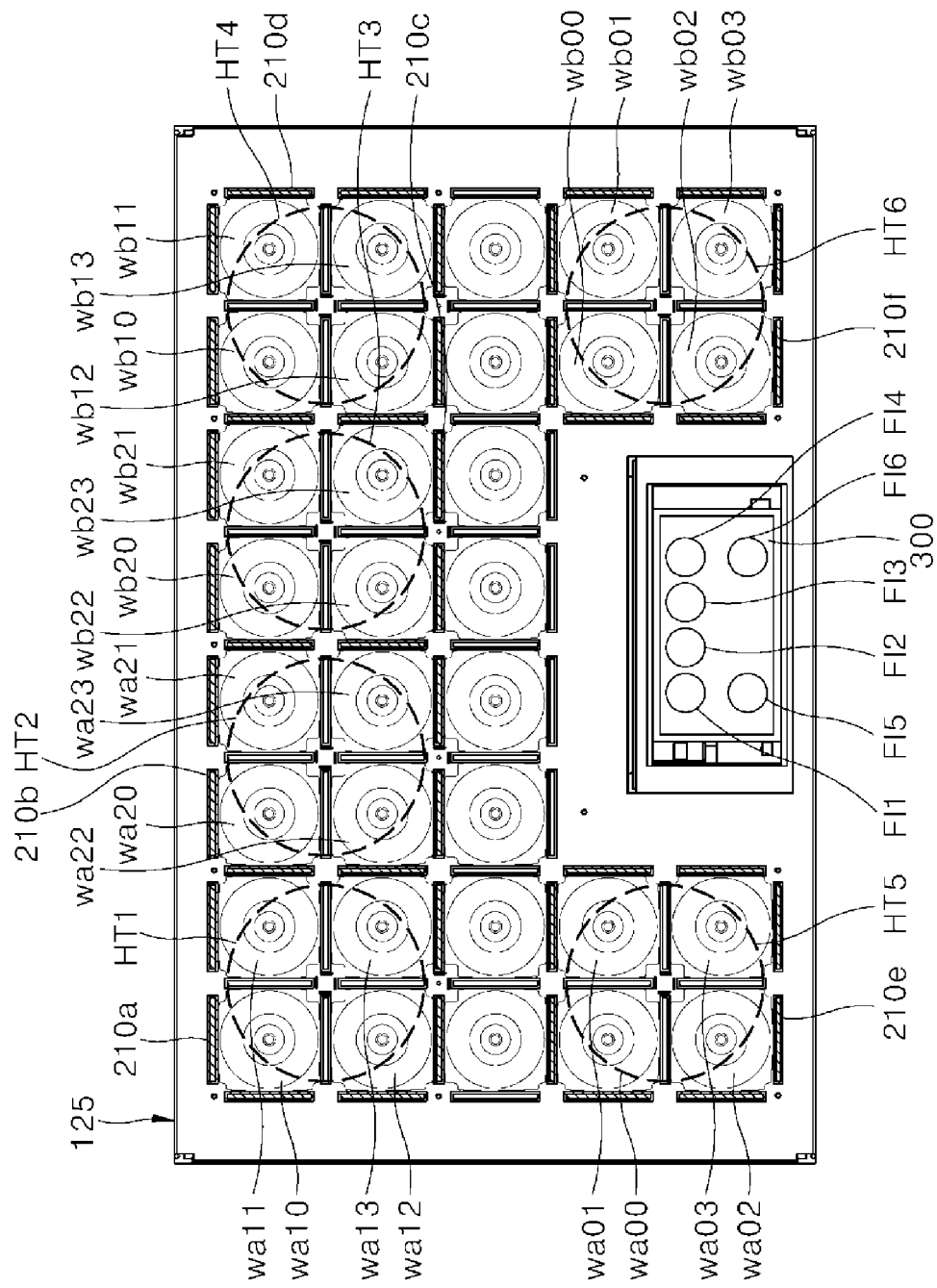
Figure 23:
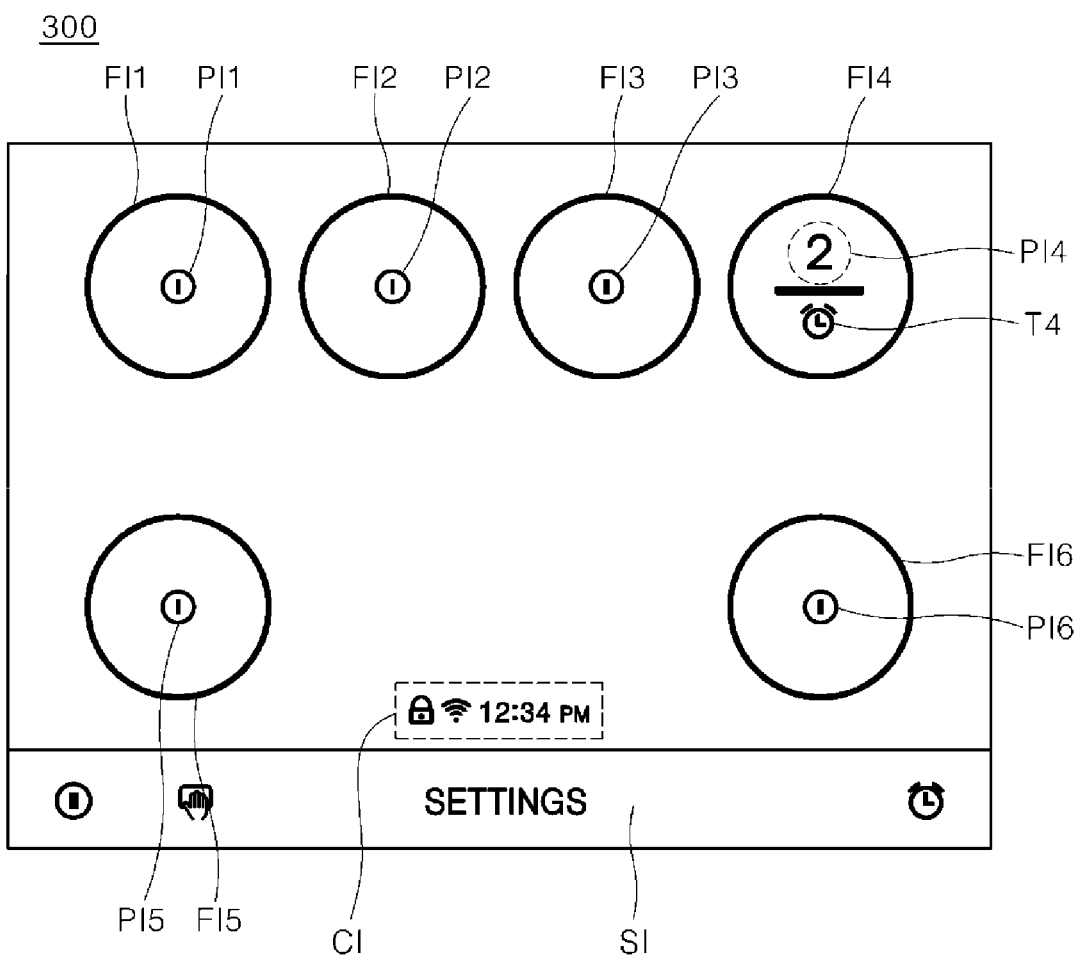

Referring to FIGS. 7, 22, and 23, a sixth example method of controlling, by the induction heating device 1 of FIG. 1, a light emitting element based on a form compensation algorithm is shown.

Specifically, when the first to sixth objects HT1 to HT6 are arranged on the upper plate (115 of FIG. 3) the cover plate (119 of FIG. 3), a first control module 310 may detect which of the plurality of working coils seats the first to sixth objects HT1 to HT6 thereabove.

The positions of the first to sixth objects HT1 to HT6 are detected (that is, the first object HT1 is detected above the working coils wa0 to wa3, and the second object HT2 is detected above working coils wa20 to wa23, and the third object HT3 is detected above the working coils wb20 to wb23, the fourth object HT4 is detected above working coils wb10 to wb13, and the fifth object HT is detected above working coils wa00 to wa03, and the sixth object HT6 is detected above working coils wb00 to wb03, the first control module 310 may provide a second control module 320 with information on a position of each of the first to sixth objects HT1 to HT6.

The second control module 320 may turn on a light emitting element arranged below a periphery of the working coils wa10 to wa13, wa20 to wa23, wb20 to wb23, wb10 to wb13, wa00 to wa03, and wb00 to wb03 at which the first to sixth objects HT1 to HT6 are detected based on the information on the position of each of the first to sixth objects HT1 to HT6 received from the first control module 310.

Then, when there are working coils (e.g., wa10 and wa11) arranged adjacent to each other in the same row or working coils (e.g., wb10 and wb12) arranged adjacent to each other in the same column, the second control module 320 may turn off the light emitting elements arranged between the adjacent working coils.

That is, as shown in FIG. 22, the second control module 320 may turn on or turn off the light emitting element arranged below the periphery of the working coils wa10 to wa13, wa20 to wa23, wb20 to wb23, wb10 to wb13, wa00 to wa03, and wb00 to wb03 at which the first to sixth objects HT1 to HT6 are detected, so that a light emitting surface of light guides (e.g., 210a, 210b, 210c, 210d, 210e, and 210f) located above the light emitting elements may be emitted.

In some implementations, some objects (for example, the first and second objects HT1 and HT2, the second and third objects HT2 and HT3, the third and fourth objects HT3 and HT4) are arranged adjacent to each other, some of the working coils at which the objects are detected (e.g., wa11 and wa20, wa13 and wa22, wa21 and wb20, wa23 and wb22, wb21 and wb10, and wb23 and wb12) may be arranged adjacent to each other.

In this case, the second control module 320 may turn on the light emitting element arranged between the working coils (e.g., wa11 and wa20, wa13 and wa22, wa21 and wb20, wa23 and wb22, wb21 and wb10, and wb23 and wb12) arranged adjacent to each other.

That is, when the working coils occupied by the different objects from each other are arranged adjacent to each other, the second control module 320 turns on the light emitting elements arranged between the working coils without turning them off, so that the user may easily distinguish the area in which the object is detected.

Further, the second control module 320 may control the input interface 300 so that the first to sixth images of the heating zone for the object FI1 to FI6 are displayed on the input interface 300.

Specifically, the second control module 320 may control the input interface 300 so that the first to sixth images of the heating area for the object FI1 to FI5 are displayed on the input interface 300 based on the information on the positions of each of the first to sixth images of the heating zone for the object HT1 to HT6 received from the first control module 310.

In some implementations, FIG. 23 shows that the image of the heating intensity PL4 and the timer image T4 are displayed only at the central region of the fourth image of the heating zone for the object FI4 among the first to sixth images of the heating zone for object FI1 to FI6 and power images PI1 to PI3, PI5, and PI6 are displayed at the central region of the remaining images of the heating zone for the object FI1 to FI3, FI5, and FI6.

In some implementations, the features described above may be implemented as a method performed by one or more processors (e.g., first control module 320 and the second control module 320).

In some implementations, the induction heating device 1 may reduce a possibility of eccentrically arranging the object above the working coil by improving the accuracy in arranging the object, by the user. Further, the degradation of the heating performance and the efficiency of the working coil due to the eccentric arrangement of the object may be prevented.

In some implementations, the induction heating device 1 improves recognition of the user with respect to the area in which the object is detected, so that the user may easily and clearly determine the area of the working coil in driving for the specific object.

In some implementations, the induction heating device 1 may improve the user convenience in various situations by improving the user experience and the user interface.

While the present disclosure has been described with reference to exemplary drawings thereof, it is to be understood that the present disclosure is not limited to the implementations and the drawings in the present disclosure, and various changes may be made by the skilled person in the art within the scope of the technical idea of the present disclosure. Although the working effects obtained from the configurations of the present disclosure is not explicitly described while describing the implementations of the present disclosure, effects predictable by the configurations has also to be recognized.

What is claimed is:

1. An induction heating device, comprising:
a case that defines a cook zone;
a plurality of working coils that are disposed in the cook zone;
a cover plate that is coupled to an upper end of the case and configured to seat an object to be heated on an upper surface of the cover plate;
an input interface that is flush with the upper surface of the cover plate, that is configured to receive touch input from a user, and that is configured to display one or more images;
a first controller configured to detect one or more of the plurality of working coils that are disposed at a location corresponding to a position of the object seated on the upper surface of the cover plate;
a second controller configured to receive information on the position of the object from the first controller and control the input interface to display an image of a heating zone for the object based on the information on the position of the object; and
a plurality of light emitting elements that are configured to emit light, that are configured to be controlled by the second controller, and that are disposed below a periphery of each of the plurality of working coils,
wherein the second controller is configured to:
analyze an arrangement form of the one or more of the plurality of working coils based on the information on the position of the object, and
control driving of at least one of the plurality of light emitting elements based on a result of analyzing the arrangement form, and
wherein the input interface is configured to:
display the image of the heating zone for the object in an area corresponding to the position of the object on the cover plate, the image of the heating zone including a representation of a size of the object and an orientation of the object, and
display a power image for controlling activation of the heating zone, the power image being displayed at a central region of the image of the heating zone.

2. The induction heating device of claim 1, wherein the second controller is configured to, based on the position of the object corresponding to a first working coil and a second working coil among the plurality of working coils, turn on one or more of the plurality of light emitting elements arranged below the periphery of each of the first working coil and the second working coil.

3. The induction heating device of claim 2, wherein the second controller is configured to:
based on the first working coil and the second working coil being disposed adjacent to each other and arranged along a row or a column defined by the plurality of working coils, turn off one or more of the plurality of light emitting elements arranged between the first working coil and the second working coil.

4. The induction heating device of claim 2, wherein the second controller is configured to:
based on the first working coil and the second working coil being disposed adjacent to each other and arranged along a first diagonal direction crossing different rows and columns defined by the plurality of working coils, turn on one or more of the plurality of light emitting elements arranged below the periphery of a third working coil that is disposed adjacent the first working coil and the second working coil at a position in a second diagonal direction orthogonal to the first diagonal direction, and turn off one or more of the plurality of light emitting elements arranged between the first working coil and the third working coil and one or more of the plurality of light emitting elements arranged between the second working coil and the third working coil.

5. The induction heating device of claim 1, wherein the second controller is configured to, based on the position of the object corresponding to a first working coil, a second working coil, and a third working coil among the plurality of working coils, turn on one or more of the plurality of light emitting elements arranged below the periphery of each of the first working coil, the second working coil, and the third working coil.

6. The induction heating device of claim 5, wherein the second controller is configured to:
based on (i) the first working coil and the second working coil being disposed adjacent to each other and arranged along a row defined by the plurality of working coils, (ii) the first working coil and the third working coil being disposed adjacent to each other and arranged along a column defined by the plurality of working coils, and (iii) the second working coil and the third working coil being disposed adjacent to each other and arranged along a first diagonal direction crossing different rows and columns defined by the plurality of working coils, turn on one or more of the plurality of light emitting elements arranged below the periphery of a fourth working coil that is disposed around the second working coil and the third working coil at a position in a second diagonal direction orthogonal to the first diagonal direction, and turn off one or more of the plurality of light emitting elements arranged between each pair of the first working coil, the second working coil, the third working coil, and the fourth working coil.

7. The induction heating device of claim 1, wherein the second controller is configured to:
based on the object comprising a first object disposed at a first position and a second object disposed at a second position, turn on one or more of the plurality of light emitting elements arranged below the periphery of each of a first working coil and a second working coil corresponding to the first position and each of a third working coil and a fourth working coil corresponding to the second position, and turn off one or more of the plurality of light emitting elements arranged between the first working coil and the second working coil and one or more of the plurality of light emitting elements arranged between the third working coil and the fourth working coil.

8. The induction heating device of claim 7, wherein the second controller is configured to, based on the first object and the second object being disposed adjacent to each other, turn on one or more of the plurality of light emitting elements arranged between one of the first working coil or the second working coil and one of the third working coil or the fourth working coil.

9. The induction heating device of claim 1, further comprising:
a plurality of light guides disposed around each of the plurality of working coils and configured to indicate a heating intensity of each of the plurality of working coils and whether each of the plurality of working coils is driven,
wherein the plurality of light emitting elements are disposed below each of the plurality of light guides.

10. The induction heating device of claim 1, wherein the input interface is configured to, based on the touch input being received on the power image, provide the second controller with the touch input, and
wherein the second controller is configured to, based on the touch input received from the input interface, control the input interface to display at least one of an image indicating a heating intensity or a timer image.

11. The induction heating device of claim 1, wherein the second controller is configured to:
receive the touch input from the input interface; and
based on the touch input received from the input interface, control at least one of the plurality of light emitting elements and the input interface.

12. The induction heating device of claim 11, wherein the first controller is configured to:
receive the touch input from the second controller; and
control driving of at least one of the plurality of working coils based on the touch input received from the second controller.

13. The induction heating device of claim 1, wherein the image of the heating zone has a circular shape surrounding the power image, the power image defining a center of the circular shape.

14. The induction heating device of claim 1, wherein the input interface is configured to, based on the touch input being received on the power image, provide the second controller with the touch input.

15. A method for operating an induction heating device that includes a case that defines a cook zone, a plurality of working coils disposed in the cook zone, a cover plate coupled to an upper end of the case and configured to seat an object to be heated on an upper surface of the cover plate, an input interface that is flush with the upper surface of the cover plate, that is configured to receive touch input from a user, and that is configured to display one or more images, the method comprising:
detecting one or more of the plurality of working coils that are disposed at a location corresponding to a position of the object seated on the upper surface of the cover plate;
determining information corresponding to the position of the object;
controlling the input interface to display an image of a heating zone for the object based on the information corresponding to the position of the object;
analyzing an arrangement form of the one or more of the plurality of working coils based on the information corresponding to the position of the object;
based on a result of analyzing the arrangement form, controlling driving of at least one of a plurality of light emitting elements that are configured to emit light and that are disposed below a periphery of each of the plurality of working coils;
displaying, on the input interface, the image of the heating zone for the object in an area corresponding to the position of the object on the cover plate, the image of the heating zone including a representation of a size of the object and an orientation of the object; and
displaying, on the input interface, a power image for controlling activation of the heating zone, the power image being displayed at a central region of the image of the heating zone.

16. The method of claim 15, wherein controlling the driving of the at least one of the plurality of light emitting elements comprises:
based on the position of the object corresponding to a first working coil and a second working coil among the plurality of working coils, turning on one or more of the plurality of light emitting elements arranged below the periphery of each of the first working coil and the second working coil.

17. The method of claim 16, wherein controlling the driving of the at least one of the plurality of light emitting elements comprises:
based on the first working coil and the second working coil being disposed adjacent to each other and arranged along a row or a column defined by the plurality of working coils, turning off one or more of the plurality of light emitting elements arranged between the first working coil and the second working coil.

18. The method of claim 16, wherein controlling the driving of the at least one of the plurality of light emitting elements comprises:
based on the first working coil and the second working coil being disposed adjacent to each other and arranged along a first diagonal direction crossing different rows and columns defined by the plurality of working coils, turning on one or more of the plurality of light emitting elements arranged below the periphery of a third working coil that is disposed adjacent the first working coil and the second working coil at a position in a second diagonal direction orthogonal to the first diagonal direction; and
turning off one or more of the plurality of light emitting elements arranged between the first working coil and the third working coil and one or more of the plurality of light emitting elements arranged between the second working coil and the third working coil.

19. The method of claim 15, further comprising:
determining a first position corresponding to a first object seated on the cover plate and a second position corresponding to a second object seated on the cover plate,
wherein controlling the driving of the at least one of the plurality of light emitting elements comprises:
turning on one or more of the plurality of light emitting elements arranged below the periphery of each of a first working coil and a second working coil disposed at the first position and each of a third working coil and a fourth working coil disposed at the second position; and
turning off one or more of the plurality of light emitting elements arranged between the first working coil and the second working coil and one or more of the plurality of light emitting elements arranged between the third working coil and the fourth working coil.

20. The method of claim 19, wherein controlling the driving of the at least one of the plurality of light emitting elements comprises:
based on the first object and the second object being disposed adjacent to each other, turning on one or more of the plurality of light emitting elements arranged between one of the first working coil or the second working coil and one of the third working coil or the fourth working coil.

* * * * *